US008859026B2

(12) United States Patent
Inglis et al.

(10) Patent No.: US 8,859,026 B2
(45) Date of Patent: Oct. 14, 2014

(54) METHOD FOR REDUCING METHOXYPYRAZINES IN GRAPES AND GRAPE PRODUCTS

(75) Inventors: Debra Inglis, Virgil (CA); Ai Lin Beh, St. Catharines (CA); Ian David Brindle, St. Catharines (CA); Gary Pickering, Port Colborne (CA); Eric Fabian Humes, Brockville (CA)

(73) Assignee: Brock University, St. Catherines (CA)

( * ) Notice: Subject to any disclaimer, the term of this patent is extended or adjusted under 35 U.S.C. 154(b) by 139 days.

(21) Appl. No.: 13/264,426

(22) PCT Filed: Apr. 14, 2010

(86) PCT No.: PCT/CA2010/000568
§ 371 (c)(1),
(2), (4) Date: Dec. 7, 2011

(87) PCT Pub. No.: WO2010/118523
PCT Pub. Date: Oct. 21, 2010

(65) Prior Publication Data
US 2012/0107467 A1    May 3, 2012

Related U.S. Application Data

(60) Provisional application No. 61/169,121, filed on Apr. 14, 2009.

(51) Int. Cl.
| | | |
|---|---|---|
| *A23C 9/14* | (2006.01) | |
| *A23L 1/015* | (2006.01) | |
| *A23L 2/02* | (2006.01) | |
| *B01D 61/14* | (2006.01) | |
| *C12G 1/02* | (2006.01) | |
| *C12H 1/044* | (2006.01) | |
| *C12H 1/052* | (2006.01) | |

(52) U.S. Cl.
CPC ............... *A23L 1/0156* (2013.01); *A23L 2/02* (2013.01); *B01D 61/145* (2013.01); *C12G 1/02* (2013.01); *C12H 1/0408* (2013.01); *C12H 1/0416* (2013.01)
USPC .................... 426/271; 426/330.4; 426/490

(58) Field of Classification Search
USPC .......................................................... 426/271
See application file for complete search history.

(56) References Cited

U.S. PATENT DOCUMENTS

| | | | |
|---|---|---|---|
| 4,310,553 A * | 1/1982 | Odintsova | 426/31 |
| 5,260,270 A | 11/1993 | Snyder et al. | |
| 2003/0108985 A1 * | 6/2003 | Houtzager et al. | 435/69.1 |

OTHER PUBLICATIONS

Pickering: Yeast strain affects 3-isopropyl-2-methoxypyrazine concentration and sensory profile in Cabernet Sauvignon wine; Australian Journal of Grape and Wine Research. Sep. 8, 2008.*
Pandel: The Acidity of Wine by Alexander J. Pandell, Ph.D. Ó 1999 by Alexander J. Pandell, All Rights Reserved.*

(Continued)

*Primary Examiner* — Patricia George
(74) *Attorney, Agent, or Firm* — Bereskin & Parr LLP/S.E.N.C.R.L., s.r.l.; Patricia Folkins

(57) ABSTRACT

The present application described a method of reducing methoxypyrazines (MPs) in grapes or grape products comprising: (a) contacting the grape or grape product with a protein that binds to MPs at a pH of about 3 to about 4 to form a protein-MP complex; and (b) removing the protein-MP complex from the grape or grape product. Also described is a method of removing MPs from samples comprising contacting the sample with a polyethersulfone membrane.

14 Claims, 19 Drawing Sheets

(56) References Cited

OTHER PUBLICATIONS

Lavin: Premium Yeast for Premium Wines; published online Oct. 24, 2006; http://web.archive.org/web/20061024165248/http://www.lalvinyeast.com/strains.asp.*
Chris: Get Cynical: Baby Mouse Wine; Oct. 19, 2007; http://www.cynical-c.com/2007/10/19/baby-mouse-wine/.*
Beer: Unravelling the Total Antioxidant Capacity of Pinotage Wines: Contribution of Phenolic Compounds ; J. Agric. Food Chem. 2006, 54, 2897-2905.*
Kwon: Cloning and Molecular Dissection of the 8.8 kb Pig Uroplakin II Promoter Using Transgenic Mice and RT4 Cells; Journal of Cellular Biochemistry 99:462-477 (2006).*
Rotter: Improved Wine Making . . . : Fining; copyright 2001-2008; http://www.brsquared.org/wine/Articles/fining.htm.*
Fennema: Food Chemistry, Third Edition; CRC Press, Jun 19, 1996—Technology & Engineering—1067 pages.*
Pickering: Determination of ortho- and retronasal detection thresholds for 2-isopropyl-3-methoxypyrazine in wine; Food Sci. Sep. 2007;72(7):S468-72.*
Harbertson: A guide to the fining of wine; WSU Extension manual EM016; Jan. 1, 2009.*
Ortega, Lina et al., "Use of solid-liquid distribution coefficients to determine retention properties of Porapak-Q resins Determination of optimal conditions to isolate alkyl-methoxypyrazines and beta-damascenone from wine", Journal of Chromatography A, 931, 2001, 31-39.
International Search Report of PCT/CA2010/000568 dated Oct. 18, 2011.
European Search Report of EP 10764021.1 dated Oct. 31, 2012.
Flower, Darren R., "Beyond the superfamily: the lipocalin receptors", Biochimica et Biophysica Acta. Protein Structure and Molecular Enzymology, Elsevier, Amsterdam; NL, vol. 1482, No. 1-2, Oct. 18, 2000, pp. 327-336.
Liang Cunzhen et al., "Removal of earthy-musty odorants in drinking water by powdered activated carbon", Database Biosis (online), Biosciences Information Service, Philadelphia, PA, 2005, Database accession No. PREV200500199194 & Journal of Environmental Science and Health Part A Toxic-Hazardous Substances and Environmental Engineering, vol. 40, No. 4, 2005, pp. 767-768, ISSN: 1093-4529.
Bignetti et al., "The pyrazine-binding protein and olfaction", Comparative Biochemistry and Physiology B. ComparativeBiochemistry, Pergamon Press, London, GB, vol. 9, No. 1, Jan. 1, 1988, pp. 1-5.

* cited by examiner

A

B

A.

B.

C.

A:

B:

C:

D:

METHOD FOR REDUCING METHOXYPYRAZINES IN GRAPES AND GRAPE PRODUCTS

This application is a National Stage of co-pending International Application No. PCT/CA2010/000568 filed Apr. 14, 2010, which claims the benefit of Provisional Application No. 61/169,121, filed Apr. 14, 2009, the contents of both of which are herein incorporated in their entirety by reference.

FIELD OF THE APPLICATION

The present application is directed to methods of removing methoxypyrazines from grapes and grape products such as wine and juice using methoxypyrazine-binding proteins such as certain members of the lipocalin family of proteins.

BACKGROUND OF THE APPLICATION

Alkyl-2-methoxypyrazines (MPs) represent an important and potent class of grape- and insect-derived odor-active compounds associated with wine quality. Specifically, 3-isobutyl-2-methoxypyrazine (IBMP), 3-isopropyl-2-methoxypyrazine (IPMP) and 3-secbutyl-2-methoxypyrazine (SBMP) are 3 grape-derived volatile compounds that elicit green and vegetative aroma and flavour descriptions in wine. Although these MPs can positively influence wine quality in some varieties (1), at higher concentrations they are dominant and unpleasant (2), can mask "fruity/floral" aromas (3), and are associated with cooler climates and under-ripe, low quality fruit (4-6).

Recently, a second source of elevated MPs in wine has been recognized that is responsible for ladybug taint (LBT; (7)). LBT is a wine defect resulting from the undesired incorporation of ladybeetles (Coleoptera: Coccinellidae), particularly *Harmonia axyridis*, into the fermentation process and is responsible for millions of dollars of lost revenue from downgraded or discarded wine in Southern Ontario and parts of the USA (8). The deleterious effects of the Multicolored Asian Lady Beetle (MALB) on grape juice and wine quality were first noticed in Ontario in 2001, where up to 50% of the wine produced from that vintage was considered tainted or not fit for sale. The prevalence of *Harmonia axyridis* in other wine regions, including Italy, France, Spain, South Africa and Argentina (9), suggests that LBT could be or become a more widespread problem for the wine industry.

Regardless of source, MPs are present in wines in trace amounts and due to their extremely low detection thresholds—in the high pg/L to low ng/L range (4, 10, 11)—have the potential to significantly lower wine quality resulting in lost revenues to grape and wine industries. Efforts to reduce MP levels have included both viticultural (12, 13) and oenological (14) interventions. However, attempts to decrease MP concentrations in wine using conventional treatments, such as fining, have had limited success (15).

SUMMARY OF THE APPLICATION

Various methoxypyrazine binding proteins were evaluated, using fluorescence binding assays, functional stability at acidic pH and competitive displacement of a fluorescent probe by IBMP and IPMP at acidic pH, for their potential to act as remedial fining agents for removal of IBMP and IPMP in grapes or grape products. It has been demonstrated that porcine Odorant Binding Protein (pIOBP) and the murine Major Urinary Protein (mMUPII) are candidate proteins to act as fining agents for removal of MPs from grapes or grape products based on their ability to bind MPs at a pH as low as pH 3.

Accordingly, the present application includes a method of reducing methoxypyrazines (MPs) in grapes or grape products comprising:
(a) contacting the grape or grape product with a protein that binds to MPs at a pH of about 3 to about 4 to form a protein-MP complex; and
(b) removing the protein-MP complex from the grape or grape product.

In an embodiment of the application, the protein that binds to methoxypyrazines at a pH of about 3 to about 4 is a protein from the lipocalin family as described in Flower D. R. Biochem. J. 1996, 318:1-14, including mammalian odorant binding proteins (OBP) and mammalian pheromone binding proteins (PBP), that bind to methoxypyrazines at a pH of about 3 to about 4. In an embodiment, binding to methoxypyrazines is predicted using fluorescence binding assays, functional stability at acidic pH and competitive displacement of a fluorescent probe by IBMP and IPMP, for example as described hereinbelow. In a further embodiment, the protein that binds to methoxypyrazines at a pH of about 3 to about 4 is selected from porcine OBPs (e.g. piglet OBP and adult pig OBP), mouse major urinary proteins (e.g. MUPII and MUPI) and human OBP (e.g. OBPIIa alpha).

In a further embodiment, the method further includes adding the protein to the grape or grape product in combination with a fining agent that binds to proteins, for example bentonite (a montmorillonite clay made of aluminum silicate). In this embodiment, the cationic protein exchanges with cations in the bentonite forming an insoluble bentonite-protein-MP complex that is removed from the grape or grape product using known methods, for example, filtration.

In another embodiment, the method further includes immobilizing the protein to facilitate removal of the protein-MP complex from the grape or grape product. In this embodiment, the protein is immobilized prior to contacting with the grape or grape product. Modes of immobilization include, for example, entrapment (covalent and non-covalent) to silica. The immobilized protein is added to the grape or grape product, a complex with MP's is formed and the immobilized protein-MP complex is removed using known methods, for example filtration. In another embodiment, the protein is immobilized on a membrane so that the proteins form a complex with the MPs as the grape or grape product is filtered through the membrane.

The present application further includes a use of a protein that binds to MPs at a pH of about 3 to about 4 to form a protein-MP complex to remove MPs from grape or grape products.

In another embodiment, the application further includes a method of treating grape or grape products to remove MPs by contacting the grape or grape product with a combination of two or more of (i) a protein that binds to MPs at a pH of about 3 to about 4 to form a protein-MP complex (ii) a polymer membrane and (iii) fining agents. These treatments are performed in any order.

It has surprisingly been shown in the present application that polyethersulfone membranes are able to remove significant amounts of MPs from solutions at a wide range of pHs and at a wide range of starting concentration of MPs. Accordingly the present application also includes a method of removing MPs from a liquid or semi-liquid sample comprising contacting the sample with a polyethersulfone membrane under conditions for removing the MPs from the sample. The application also includes a use of polyethersulfone membranes to remove MPs from liquid or semi-liquid samples.

Other features and advantages of the present disclosure will become apparent from the following detailed description. It should be understood, however, that the detailed description and the specific examples while indicating preferred embodiments of the disclosure are given by way of illustration only, since various changes and modifications within the spirit and scope of the disclosure will become apparent to those skilled in the art from this detailed description.

BRIEF DESCRIPTION OF THE DRAWINGS

The application will now be described in greater detail with reference to the drawings in which.

DETAILED DESCRIPTION

Definitions

Figure 1:
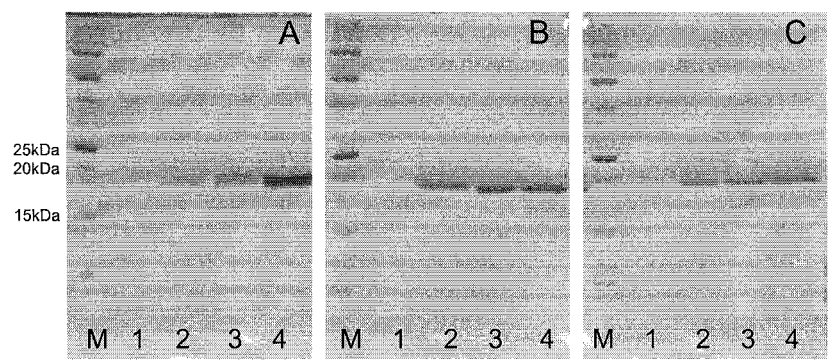
FIG. 1 shows an SDS-PAGE analysis of the expression and purification of recombinant odorant binding proteins; (A) rat OBP1F, (B) piglet OBP, (C) mouse MUPII. Lane M, Molecular weight marker (BioRad Precision Plus); Lanes 1-3, day 0 to day 2 of methanol induction; Lane 4, proteins after ion exchange purification

The following definitions, unless otherwise stated, apply to all aspects and embodiments of the present application.

Abbreviations used: 1-AMA, 1-aminoanthracene; IBMP, 2-isobutyl-3-methoxypyrazine; IPMP, 2-isopropyl-3-methoxypyrazine; FPLC, fast protein liquid chromatography; SDS PAGE, sodium dodecyl sulfate-polyacrylamide gel electrophoresis; OBP, odorant binding protein, pIOBP, piglet OBP; pOBP, adult porcine OBP, mMUPII, mouse major urinary protein isoform II, rat OBP1F, rat OBP variant 1F In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

Processes of the Application

Methoxypyrazines (MP) are known to be relatively resilient to traditional juice/wine manufacturing processes (15). The present application reports alternative approaches for reducing MP levels in juice/wine using proteins with naturally high affinity for MPs for use as fining agents. The lipocalin protein family contain such proteins (16), mammalian odorant-binding proteins (OBP) & mammalian pheromone binding proteins (PBP), both with high affinity to MPs in the low 0.3-2 µM range (17-19). In the present application, two proteins, the porcine Odorant Binding Protein pIOBP and the murine Major Urinary Protein (MUPII) have been shown to function in the low pH range of 3-4 found in grape juice and wine with high affinity binding to MPs as tested using a fluorescence competitive displacement assay. In this application, these proteins were expressed in the methylotrophic yeast *Pichia pastoris*, the proteins were purified from the yeast growth media and were tested for their ability to remove IBMP and IPMP from solution. Initial IBMP and IPMP free in solution were measured using HS SPME GC/MS and compared to the concentration of free (unbound) MP fraction after the protein-MP complex was removed either by filtration through a 10 kDA MW cutoff filter or by bentonite fining. The present application therefore includes a protein-based fining agent that reduces MPs in juice and wine to detection levels acceptable by wine consumers.

Accordingly, the present application includes a method of reducing methoxypyrazines (MPs) in grapes or grape products comprising:

(a) contacting the grape or grape product with a protein that binds to MPs at a pH of about 3 to about 4 to form a protein-MP complex; and (b) removing the protein-MP complex from the grape or grape product.

In an embodiment of the application, the protein that binds to methoxypyrazines at a pH of about 3 to about 4 is a protein from the lipocalin family as described in Flower D. R. Biochem. J. 1996, 318:1-14, including mammalian odorant binding proteins (OBP) and mammalian pheromone binding proteins (PBP) that bind to MPs at a pH of about 3 to about 4. Odorant-binding proteins (OBP), are low molecular weight, soluble proteins secreted by glands of the respiratory nasal mucosa that bind to hydrophobic odorants to deliver these odorants to olfactory neurons. Mammalian OBP have been identified in a variety of species including cow, pig, rabbit, mouse, rat, elephant and human (19). In addition to mammalian OBPs having strong affinity to MPs, another member of the lipocalin family known to transport pheromones has been identified that can bind MPs with high affinity; the mouse MUPII protein found in the urine of mice (20). In a further embodiment, the protein that binds to MPs at a pH of about 3 to about 4 is selected from porcine OBPs (e.g. piglet OBP and adult pig OBP), mouse major urinary proteins (e.g. MUPII and MUPI) and human OBP (e.g. OBPIIa alpha). In another embodiment, the protein that binds to methoxypyrazines at a pH of about 3 to about 4 is selected from piglet OBP, MUPII and human OBPIIa. In another embodiment, the protein that binds to methoxypyrazines at a pH of about 3 to about 4 is selected from piglet OBP and MUPII.

In an embodiment, protein binding to MPs is predicted using fluorescence binding assays, functional stability at acidic pH and competitive displacement of a fluorescent probe by IBMP and IPMP, for example as described hereinbelow.

In a further embodiment of the application, the protein is either chemically synthesized or is prepared using recombinant expression systems, for example by transfecting cells of, for example a yeast or bacteria, with a gene that will encode the protein in the cells, expressing the protein in the cells or secreting the protein from the cells and isolating the protein. Methods of chemically synthesizing proteins and recombinantly expressing proteins are well known in the art.

In a further embodiment, the method of the application further includes adding the protein to the grape or grape product in combination with a fining agent that binds to proteins, for example bentonite (a montmorillonite clay made of aluminum silicate). In this embodiment, the cationic protein exchanges with cations in the bentonite forming an insoluble bentonite-protein-MP complex that is removed from the grape or grape product using known methods, for example, filtration.

In another embodiment, the application further includes a method of treating grape or grape products to remove MPs by contacting the grape or grape product with a combination of two or more of (i) a protein that binds to MPs at a pH of about 3 to about 4 to form a protein-MP complex (ii) a polymer membrane and (iii) fining agents. These treatments are performed in any order. In an embodiment, the method of the application includes treating the grape or grape product with fining agents, such as bentonite and/or contacting the grape or grape product with a polymer membrane prior to treatment with the protein that binds to MPs at a pH of about 3 to about 4 to form a protein-MP complex. In a further embodiment, the grape or grape product is filtered through a polymer membrane prior to treatment with protein that binds to MPs at a pH of about 3 to about 4 to form a protein-MP complex and removing the protein-MP complex from the grape or grape product. In yet another embodiment, the grape or grape product is treated with a fining agent, such as bentonite, followed by filtering through a polymer membrane prior to treatment with the protein that binds to MPs at a pH of about 3 to about 4 to form a protein-MP complex and removing the protein-MP complex from the grape or grape product. In an embodiment, the polymer membrane is any membrane used to filter grapes or grape products. In a further embodiment the polymer membrane is a PES membrane.

In another embodiment, the method of the application further includes immobilizing the protein to facilitate removal of the protein-MP complex from the grape or grape product. In this embodiment, the protein is immobilized prior to contacting with the grape or grape product. Modes of immobilization include, for example, entrapment (covalent and non-covalent) to silica. Methods of immobilizing proteins to the surface of silica matrixes or within silica matrixes are well known in the art. The immobilized protein is added to the grape or grape product, a complex with MP's is formed and the immobilized protein-MP complex is removed using known methods, for example filtration. In another embodiment, the protein is immobilized on a membrane so that the proteins form a complex with the MP's as the grape or grape product is filtered through the membrane. Methods of immobilizing proteins on membranes are well known in the art. For example, polyethersulfone membranes modified to incorporate aldehyde groups for covalent attachment of proteins are readily available, for example from Pall Life Sciences, Ann Arbor, Mich.

In an embodiment of the application the grape or grape product is wine or grape juice.

The term "reducing" as used herein means any detectable decrease in the amount of MPs in the grape or grape product as compared to control levels (e.g. grape or grape products treated under identical conditions except in the absence of proteins that binds to MPs at a pH of about 3 to about 4 to form a protein-MP complex). In an embodiment, the amount of MP's in the grape or grape product is reduced to a level at which they do not negatively impact the palatability of the grape or grape product.

It has surprisingly been shown in the present application that polyethersulfone (PES) membranes are able to remove significant amounts of MPs from solutions at a wide range of pHs and at a wide range of starting concentration of MPs. Accordingly the present application also includes a method of removing MPs from a liquid or semi-liquid sample comprising contacting the sample with a polyethersulfone membrane under conditions for removing the MPs from the sample. The application also includes a use of polyethersulfone membranes to remove MPs from liquid or semi-liquid samples. In an embodiment of the application the polyethersulfone membrane comprises any PES polymer capable of binding MPs. In an embodiment of the application the PES membrane is an about 10 kDa molecular weight cut-off membrane. In an embodiment of the application the contacting comprises passing the sample through the membrane. In another embodiment of the application, the contacting comprises immersing the membrane in the sample for a time and at a temperature to reduce the MPs in the sample and removing the membrane from the sample. The term "semi-liquid" refers to any sample that is capable of passing through a membrane comprising MPs for removal and that may also contain solid, suspended particles. The term "liquid" refers to any sample containing MPs for removal, including, but not limited to, wine, juice, water, and other food-based liquids.

EXAMPLES

The following Examples are set forth to aid in the understanding of the invention, and are not intended and should not be construed to limit in any way the invention set forth in the claims which follow thereafter.

Materials and Methods

Cultures and Chemicals

The yeast *Pichia pastoris* strain GS115 and expression vector pPIC9 were purchased from Invitrogen (San Diego, Calif.). Synthesis and subcloning of genes were done by GenScript Corp (Picataway, N.J.). Promega restriction endonucleases (Madison, Wis.), Qiagen QIAprep spin miniprep kit (Qiagen Sciences, MA) were used for cloning. Oligonucleotides were purchased from Sigma Aldrich (Oakville, Canada). Prepacked FPLC columns were products from GE Healthcare (Picataway, N.J.). Protein molecular weight markers and electrophoretic reagents were products from BioRad Laboratories (Richmond, Calif.).

The fluorescent probe 1-Aminoanthracene, and odorants IBMP and IPMP, were purchased from Sigma Aldrich (St. Louis Mo.).

Construction of Expression Vectors cDNA sequence encoding mature piglet OBP (Genbank AF436848) and the mouse MUPII (Genbank AJ309921) were designed for heterologous expression in the methylotrophic yeast *P. pastoris* as follows: at the 5' end of coding sequences, native signal peptide sequences were removed and replaced with XhoI (CTC GAG ([SEQ ID NO: 1]) and prepro sequence of the *S. cerevisiae* α-mating factor (AAA AGA [SEQ ID NO:2]). A stop codon and an EcoRI restriction site were added at the 3' terminus. The sequences were then optimized for G+C content and preferred codon usage in *P. pastoris*. Modified coding sequences were synthesized and cloned in frame with the α-mating factor secretion signal into the pPIC9 expression vector between the XhoI and EcoRI sites (GenScript Corp., Piscataway, N.J.). Further information about the protein sequences is provided below:

1. Piglet/Prepubertal Pigs OBP

Uniprot ID Q8WMH1-1, Genbank AF436848. *chain comprises 158 residues *differs from adult isoform/variant by an additional lysine residue at the C terminal end. Tissue source for cloning and binding: vomeronasal organ, but the isomer is also found in both vomeronasal and nasal mucosa.

Codon Optimized Sequence:

[SEQ ID NO: 3]
CTCGAGAAAAGACAAGAACCTCAACCAGAACAAGACCCTTTTGAATTAT

CAGGAAAGTGGATAACCTCTTACATTGGTTCCTCTGATTTGGAAAAGAT

TGGTGAAAATGCACCATTCCAAGTTTTCATGAGATCCATAGAATTTGAT

GATAAAGAAAGCAAAGTCTACCTGAACTTCTTCTCTAAGGAGAATGGTA

TCTGTGAAGAATTTAGTCTGATAGGTACTAAGCAAGAGGGTAATACTTA

CGATGTTAATTATGCTGGTAACAACAAGTTTGTTGTCTCTTACGCAAGT

GAAACTGCCTTAATCATCTCTAACATTAACGTGGATGAAGAGGGTGATA

AGACCATTATGACTGGTTTGCTGGGAAAAGGTACTGACATAGAAGATCA

GGATTTGGAAAAGTTTAAGGAGGTAACTAGGGAGAACGGTATTCCTGAA

GAAAATATTGTGAATATCATTGAAAGGGATGATTGTCCTGCTAAATAAG

AATTC

Non-Optimized Sequence:

[SEQ ID NO: 4]
CTCGAGAAAAGACAGGAACCTCAACCTGAACAAGATCCCTTTGAGCTTT

CAGGAAAATGGATAACCAGCTACATAGGCTCTAGTGACCTGGAGAAGAT

TGGAGAAAATGCACCCTTCCAGGTTTTCATGCGTAGCATTGAATTTGAT

GACAAAGAGAGCAAAGTATACTTGAACTTTTTTAGCAAGGAAAATGGAA

TCTGTGAAGAATTTTCGCTGATCGGAACCAAACAAGAAGGCAATACTTA

CGATGTTAACTACGCAGGTAACAACAAATTTGTAGTTAGTTATGCGTCC

GAAACTGCCCTGATAATCTCTAACATCAATGTGGATGAAGAAGGCGACA

AAACCATAATGACGGGACTGTTGGGCAAAGGAACTGACATTGAAGACCA

AGATTTGGAGAAGTTTAAAGAGGTGACAAGAGAGAACGGGATTCCAGAA

GAAAATATTGTGAACATCATCGAAAGAGATGACTGTCCTGCCAAGTGAG

AATTC 2. cf. Adult Pig OBP (Uniprot ID P81245)
Chain length 157 residues; source: nasal mucosa,
3. mouse MUPII (MUPIIa Genbank AJ309921, MUP BL1 gene, Uniprot ID P11589)
Sequence:

[SEQ ID NO: 5]
CTCGAGAAAAGAGAAGAAGCTAGTTCTACGGGAAGGAACTTTAATGTAG

AAAAGATTAATGGGGAATGGCATACTATTATCCTGGCCTCTGACAAAAG

AGAAAAGATAGAAGATAATGGCAACTTTAGACTTTTTCTGGAGCAAATC

CATGTCTTGGAGAAATCCTTAGTTCTTAAATTCCATACTGTAAGAGATG

AAGAGTGCTCCGAATTATCTATGGTTGCTGACAAAACAGAAAAGGCTGG

TGAATATTCTGTGACGTATGATGGATTCAATACATTTACTATACCTAAG

ACAGACTATGATAACTTTCTTATGGCTCATCTCATTAACGAAAGGATG

GGGAAACCTTCCAGCTGATGGGCTCTATGGCCGAGAACCAGATTTGAG

TTCAGACATCAAGGAAAGGTTTGCACAACTATGTGAGGAGCATGGAATC

CTTAGAGAAAATATCATTGACCTATCCAATGCCAATCGCTGCCTCCAGG

CCCGAGAATGAGAATTC 4. cf. mouse MUPI (Uniprot Protein ID P11588)*MUPI differs from MUPII by three amino acid residues, N, Q, K
*binds both IPMP and IBMP; Bingham 2004, Barratt 2005
*pH of binding: 7.4
5. human OBPIIa alpha (Genbank AJ251021, UniProt ID Q9NY56)
Sequence:

[SEQ ID NO: 6]
CTCGAGAAAAGATTGTCTTTTACTTTGGAAGAGGAAGATATTACTGGTA

CTTGGTACGTTAAAGCTATGGTTGTTGATAAGGATTTTCCTGAAGATAG

AAGACCAAGAAAGGTTTCTCCAGTTAAGGTTACTGCTTTGGGTGGTGGA

AACTTGGAAGCTACTTTTACTTTTATGAGAGAGGATAGATGTATTCAAA

AGAAGATTTTGATGAGAAAGACTGAGGAGCCTGGTAAGTTTTCTGCTTA

CGGTGGTAGAAAGTTGATTTACTTGCAAGAATTGCCAGGAACTGATGAT

TACGTTTTCTATTGTAAAGATCAAAGAAGAGGTGGTTTGAGATACATGG

GTAAATTGGTTGGAAGAAACCCAAACACTAACTTGGAAGCTTTGGAAGA

ATTTAAAAAGTTGGTTCAACACAAGGGTTTGTCTGAGGAAGATATTTTC

ATGCCATTGCAAACTGGTTCTTGTGTTTTGGAACATTAAGAATTC

Transformation of *P. pastoris*

Plasmids were propagated in *E. coli* strain Top 10. Five to ten micrograms of isolated plasmid DNA were linearized at the BglII site located in the 5' alcohol oxidase (AOX1) gene to promote homologous recombination into the *P. pastoris* host GS115 (His⁺Mut⁺). Competent cells were prepared according to the protocol described in the *Pichia* Expression Kit manual (Invitrogen, San Diego, Calif.). Electroporation conditions on a Gene Pulser apparatus (1.5 kV, 200Ω, 25 μF) were as recommended by the manufacturer (BioRad, Hercules, Calif.).

Transformants were recovered on histidine deficient-MD plates (1.34% YNB, $4\times10^{-5}$% biotin, 2% dextrose) and RDB plates (1.34% YNB, $4\times10^{-5}$% biotin, 0.005% amino acids, 1M sorbitol, 2% dextrose), and screened for Mut$^s$ phenotypes by comparing growth on MM plates (1.34% YNB, $4\times10^{-5}$% biotin, 0.5% methanol) and MD plates (1.34% YNB, $4\times10^{-5}$% biotin, 1% glucose).

Genetic integration was analyzed on His⁺Mut$^s$ clones by whole cell PCR with forward α-mating factor and reverse 3'AOX1 primer pairs. The target coding sequence was reconfirmed by sequencing the amplified fragment.

Recombinant *P. pastoris* containing the ratOBP-1F gene, inserted into the pPIC9 vector was kindly provided by J.-C. Pernollet of INRA, France (21).

Expression of Recombinant Lipocalins

Cells were grown in 100 ml BMGY (1% yeast extract, 2% peptone, 0.1M potassium phosphate pH 6.0, 1.34% YNB, $4\times10^{-5}$% biotin, 1% glycerol) at 28° C., 200 rpm. Cultures (16-18 h) were centrifuged at 1500 g for 10 min at 4° C., and the cell pellet (about 5 g wet weight from 100 ml) was resuspended in 20 ml BMM (0.1M potassium phosphate pH 6.0, 1.34% YNB, $4\times10^{-5}$% biotin, 1% methanol) at 28° C., 200 rpm. Methanol was added to a final concentration of 1% (v/v) daily to maintain induction. Six clones of each pIOBP, mMUPII and hOBPIIaα were screened for protein overexpression over an induction period of five days.

Purification of Recombinant Lipocalins pIOBP and mMUPII from 200 ml of a 2 day growth of *Pichia pastoris* transformants in BMM were purified from the growth supernatant by ion exchange and freeze dried. pIOBP and mMUPII were purified in a single anion exchange chromatography step on an Äkta Explorer FPLC System (GE Healthcare, Piscataway, N.J.). Two day BMM culture supernatant was collected by centrifugation at 3000 g, 10 min at 4 C and filtration through 0.45 uM membrane (Millipore, Billerica, Mass.). Clarified supernatant was equilibrated to 20 mM Tris-Cl, pH 8.0 with a10 kDa molecular weight cut off dialysis tubing (Spectra Por) for 3 d at 4° C. and loaded onto a Hi Trap Q Sepharose 1 ml column pre equilibrated with 20 mM Tris-Cl, pH 8.0. Elution was carried out with a linear gradient of 0 to 1.0M NaCl in 20 mM Tris-Cl, pH 8.0. Peak fractions (0.5 ml) were collected and analyzed by SDS PAGE. Purified protein was dialyzed against MQ water and lyophilized.

Purification of ratOBP1F and hOBPIIaα followed the same anion exchange procedure and further separated by size exclusion chromatography. Pooled fractions from two anion exchange runs were resuspended in 50 mM sodium phosphate, 0.15M NaCl, pH 7.2 and applied to a Hi Prep 16/60 Sephacryl S100 HR column at a flow rate of 0.5 ml/min. The column was calibrated using blue dextran and protein markers from the low molecular weight Gel Filtration Calibration Kit (GE Healthcare, Piscataway, N.J.). Eluted fractions containing OPB were determined on SDS PAGE.

Total protein concentration was determined using the Bradford Assay (Sigma Aldrich), using Bovine Serum Albumin (Pierce, Rockford, Ill.) to generate a standard curve. Purified OBP were shown to be >95% pure in Coomassie stained SDS PAGE by densitometry analysis (Scion Imaging Software, Scion Corp., Frederick, Mass.).

Fluorescence Binding Assay

Fluorescence ligand binding experiments were performed on a Photon Technology International (London, Canada) Quanta Master Model QM2001 fluorometer at room temperature (19-20° C.), using 1 cm light path quartz cuvettes (Hellma). Slit width of 2 nm was used for excitation and emission for assaying a proteins except ratOBP1F, for which excitation and emission slit width of 6 nm was used.

Fluorescence Emission Spectra Using 1-AMA

Binding curves with 1-AMA were obtained by titrating protein (2 μM) in 50 mM sodium phosphate, pH 7.2 with ligand (0-50 uM, prepared gravimetrically as a 1 mM stock solution in 10% v/v methanol). To examine dependence of binding on pH, fluorescence spectra was measured in 50 mM citrate phosphate solutions at pH 3.0, 4.0 and 5.0. Fluorescence of 1-AMA was excited at 290 nm and emission was scanned from 450 to 550 nm.

Dissociation constants were calculated from a plot of fluorescence intensity against total ligand concentration fitted with non linear regression using Prism 3.02 (GraphPad Software Inc., La Jolla, Calif.).

The interaction of odorants with AMA complex was examined by monitoring the decrease in fluorescence intensity of protein/1-AMA complex upon the addition of competitor compounds.

In competitive binding assays, 1-AMA (10 μM) was equilibrated with protein (2 μM) at pH 7.2 50 mM sodium phosphate buffer and pH 3.0 50 mM citrate phosphate buffer, and titrated with increasing concentrations of odorants (0-100 μM) solubilized in 10% v/v methanol.

The affinity of OBPs for odorants was estimated by plotting the decrease of intensity of 1-AMA fluorescence at the emission maximum, (22). Odorant concentrations causing fluorescence decay to half-maximal intensity ($IC_{50}$ values) were determined from the plot of $(I-I_{min})/(I_0-I_{min})$ against the competitor concentration; $I_0$ is the maximum of fluorescence intensity of the protein/1-AMA complex; I is the fluorescence intensity after addition of an aliquot of competitor, and $I_{min}$ the fluorescence intensity at saturating concentration of the competitor.

Protein-MP Binding Reactions

The freeze dried preparations of pIOBP and mMUPII were resuspended in phosphate citrate buffers at pH 3.0, 3.5 or 4.0 or phosphate buffer at pH 7.2, to final concentrations between 40-50 μM. The protein solutions, in a 2 ml volume, were spiked with IBMP or IPMP at 300 ng/l and allowed to incubate in a glass vial for 2 h, at RT on a gel shaker. In binding reactions using bentonite to remove the protein-MP complex, the binding reactions were performed in pH 3.5 and pH 4 using bentonite (3 g/l) to remove the protein and protein-ligand complex. To remove any residual bentonite from the reaction, samples were also filtered through a 0.22 μm Durapore filter unit (Millipore). In another assay using a 10 kDa cutoff filter to remove the protein-MP complex, the binding reactions were performed in buffer at pH 3 and pH 7.2. The reactions were centrifuged through a 10 KDa molecular weight cut-off (10MWCO) Omega filter unit made of polyethersulfone (PALL Life Sciences) to separate the proteins and bound MP from the free MP fraction. The concentration of free (unbound) MP fraction was then determined using HS SPME GC/MS. The limit of quantification for the compound IBMP was determined to be 6 ng/L and for IPMP was 2 ng/L, based on 10 times signal/noise. The limit of detection for MPs in the present system is 1.8 ng/L for IBMP and 0.6 ng/L for IPMP as calculated based on 3 times the signal/noise ratio. The data has been reported to the limit of quantification in the figures.

A direct measurement of protein binding to MPs is possible using a high sensitivity measurement technique (Kotseridis et al J. Chromatogr. A 2008; 1190: 294-30) and an Agilent GC/MS (7890A GC/5975C MSD) with Gerstel MPS2-XL autosampler.

For the membrane filtration trials, the starting concentration of MPs in the reaction were tested, the free MPs after the 10MWCO filtration without addition of protein were tested, and the free MPs in solution after the protein binding reaction and filtration were tested.

For the bentonite filtration system, the starting concentration of MPs in the reaction were tested, the free MPs after filtration through the 0.22 μm Durapore filter were tested, the free MPs after bentonite addition and filtration through the 0.22 μm filter were tested, and the free MPs after the protein binding reaction, bentonite fining and filtration were tested.

RESULTS

Example 1

Expression and Purification

Synthetic genes corresponding to the amino acid sequence of rat OBP-1F, piglet OBP, human OBPIIaα and mouse MUPII were cloned into the pPIC9 vector for secreted expression in the yeast host *P. pastoris*. Using this system, 80 mg of pure recombinant rat OBP-1F and 130 mg of pure recombinant mMUPII were routinely recovered from 1 L of culture over an induction period of 2 d. Recombinant piglet OBP was obtained, with yields of up to 130 mg purified protein per liter of culture and up to 100 mg/L of purified humanOBPIIaα was recovered, induced over a period of 2 d. Overexpression of recombinant proteins with this system provided sufficiently high protein yields with which binding assays could be undertaken.

Example 2

Characterization of Recombinant Proteins

Recombinant rat OBP-1F, piglet OBP and mouse MUPII all migrated as a single predominant band on 15% SDS-PAGE of about 18 kDa (FIGS. 1A, 1B and 1C respectively). The molecular mass of recombinant proteins is consistent with the predicted/calculated molecular mass (UniProt) and by mass spectroscopy measurements previously reported for rat OBP-1F at 18.1 kDa (21), piglet OBP at 17.5 kDa (23) and mouse MUPII at 18.7 kDa (20). The 18 kDa protein band was absent in expression cultures of *P. pastoris* harbouring the parent vector pPIC9 (data not shown).

The interaction of various olfactory proteins to the fluorescent probe, 1-AMA at physiological pH is well documented. Fluorescence binding assays with 1-AMA are widely used to characterize the novel and recombinant proteins belonging to this family. When bound to OBP, 1-AMA undergoes a blue shift in emission $\lambda$max and an enhancement in fluorescence intensity (reviewed in 24), corresponding to a change in its local environment, from polar (solvent exposed) to a more hydrophobic nature found within the protein binding core (25).

Figure 2:
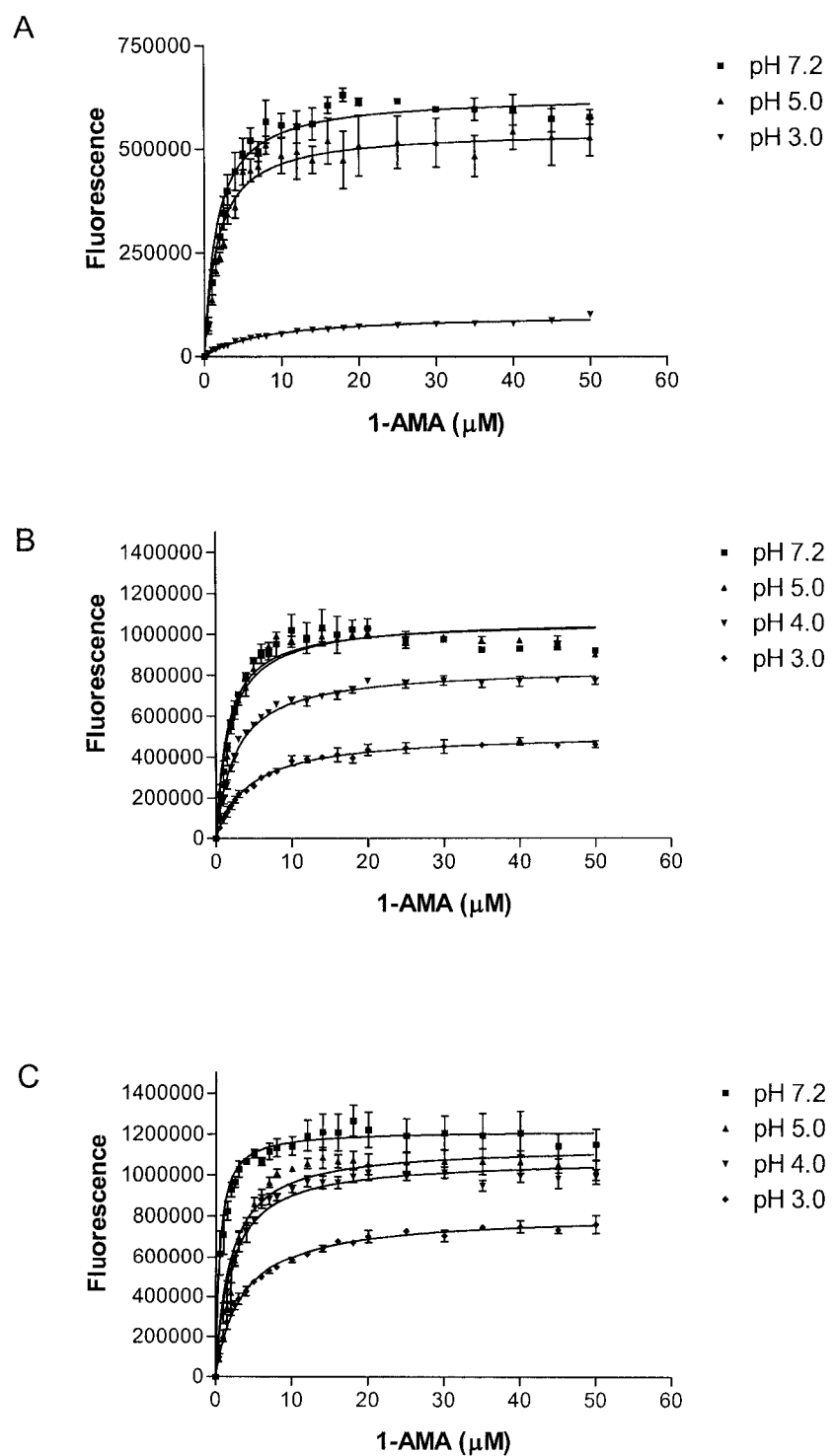
FIG. 2 shows the effect of pH on 1-Aminoanthracene (1-AMA) binding to rat OBP-1F (A); piglet OBP (B); and mouse MUPII (C). The excitation wavelength of 290 nm was used and fluorescence emission intensities were monitored at 504 nm, 483 nm and 486 nm for rat OBP1F, piglet OBP and mouse MUPII respectively.
Figure 3:
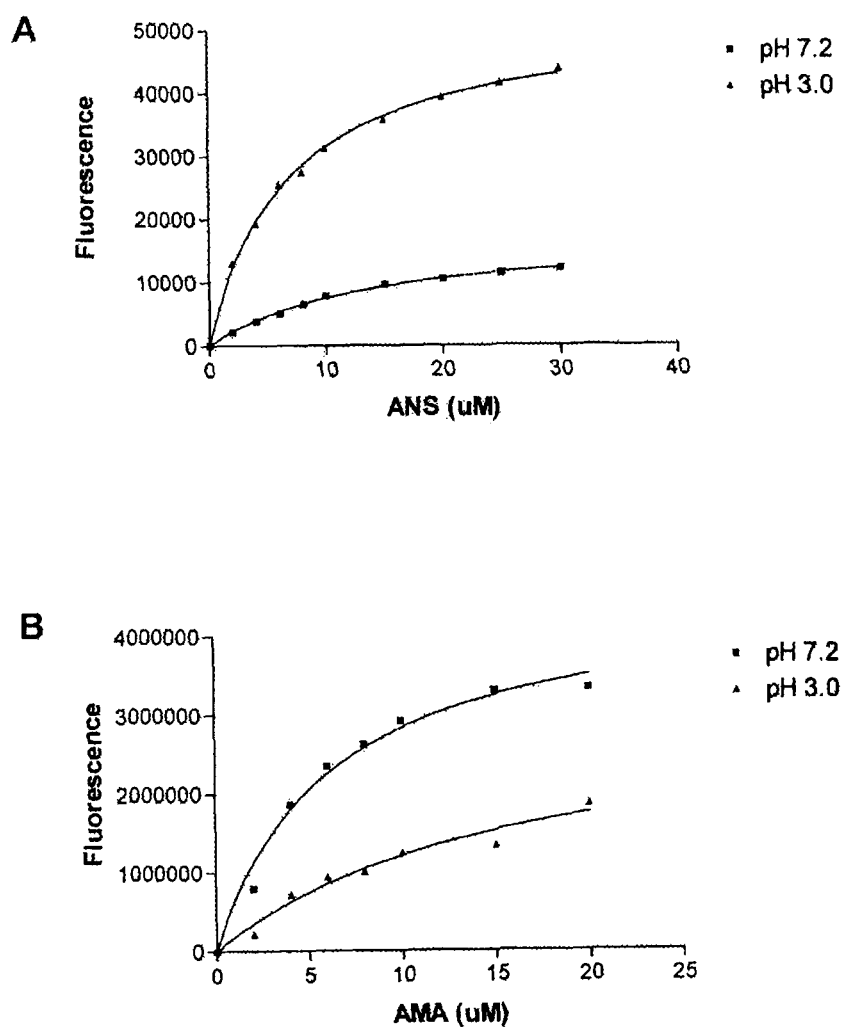
FIG. 3A shows binding of human OBPIIa$\alpha$ to fluorescent probe 1,8 ANS at pH 7.2 and pH 3.0. The excitation wavelength of 372 nm was used for ANS and fluorescence emission intensity was monitored at 475 nm.
FIG. 3B shows binding of human OBPIIa$\alpha$ to fluorescent probe 1-AMA at pH 7.2 and pH 3.0. The excitation wavelength of 290 nm was used and fluorescence emission intensity was monitored at 490 nm.
Figure 4:
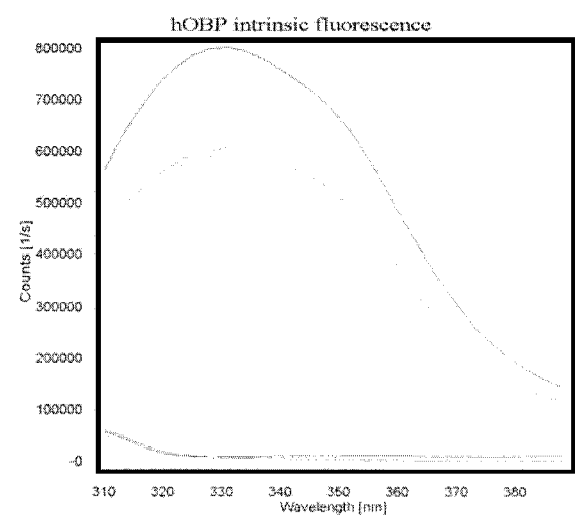
FIG. 4 shows the intrinsic fluorescence of human OBPIIa$\alpha$ at pH 7.2 (top curve) and pH 3.0 (next curve down). Buffer without protein, 50 mM sodium phosphate solution pH 7.2, 50 mM phosphate citrate, pH 3.0 (bottom two curves). The excitation wavelength of 372 nm was used. Compared with that of pH 7.2, the position of the tyrptophan emission maxiumum, $\lambda_{max}=330$ nm is not altered at pH 3.0, suggesting that under acidic conditions of pH 3.0, tryptophan located within the hydrophobic protein core of human OBPIIa$\alpha$ is not solvent exposed and that acidification to pH 3.0 does not modify protein conformation.

Free 1-AMA gave an emission $\lambda$max of 550 nm, and the emission $\lambda$max of 500 nm, 483 nm and 486 nm was detected for 1-AMA in the presence of recombinant rat OBP-1F, piglet OBP and mouse MUPII, respectively. Both recombinant rat OBP-1F and piglet OBP exhibited characteristic binding specificities as previously described for 1-AMA (Kd=0.6 uM for rat OBP-1F reported by Briand et al. 2000 (21); Kd=1.2-1.3 uM for the adult porcine isoform reported by Paolini et al. 1999 (26), Ramoni et al. 2007 (27). The affinity values here suggest that the recombinant proteins were correctly folded/disulfide bonds correctly processed using the *P. pastoris* expression system. FIG. 2 shows the 1-AMA binding isotherms for recombinant rat OBP-1F, piglet OBP and mouse MUPII and their calculated dissociation constants are reported in Table 1. FIG. 3 shows the 1-ANS (FIG. 3A) and 1-AMA (FIG. 3B) binding isotherms for recombinant human OBPIIa$\alpha$. FIG. 4 shows the intrinsic fluorescence of human OBPIIa$\alpha$ at pH 7.2 and 3.0 which indicates that acidification to pH 3 does not modify protein confirmation.

Example 3

Functionality of Recombinant OBP and MUP at Acidic pH

To evaluate the pH dependence on recombinant rOBP 1F, pIOBP and mMUPII binding behaviour, 1-AMA fluorescence assays were carried out in phosphate citrate solutions buffered to pH 3.0, pH 4.0 and pH 5.0. Generally, the pH profiles showed a reduction in binding affinity with decreasing pH values (Table 1 and FIG. 2).

The affinity of rOBP 1F at pH 5.0 was not greatly different to that of pH 7.2. However, specific emission maximum and saturable binding curve was not detected at pH 3.0 (FIG. 2A). Binding impairment at pH 3.0 may be related to a reversible aggregation state or the dissociation of rOBP 1F into its non-functional monomeric subunits (19).

For pIOBP, saturable binding was demonstrated at all pH tested; the dissociation constants obtained for pH 5.0 and pH 7.2 were not very different. Compared with pH 7.2, a 2-fold and 3.4-fold decrease in binding affinity was observed at pH 4.0 and pH 3.0 respectively. Additionally, the maximal binding capacity measured was approximately halved at pH 3.0 compared with that at pH 7.2 (FIG. 2B). In an earlier study with pOBP, the adult porcine OBP isoform; using isothermal calorimetry. Burova et al., 1999, (28) reported that the affinity of this protein to IBMP remained relatively unchanged at pH 6.6, pH 4.1 and pH 3.5

In addition to the 1-AMA binding affinity, it was observed that the binding capacity of pIOBP was approximately halved at pH 3.0, compared with that at pH 7.2 (FIG. 2B). The reduction in the binding capacity at acidic pH was also noted for adult porcine OBP by Burova et al., 1999 (28); their reported values for molar binding stoichiometry n, from isothermal calorimetry were 1.220, 1.080 and 0.417 for pH 6.6, pH 4.1 and pH 3.5 respectively. The authors attributed the lowered binding capacity to a shift from dimeric state at physiological pH (pH 6-7) to a predominantly monomeric form at acidic pH (pH<4.5).

Despite the dissociation of its quaternary structure at pH<4.5, circular dichroism spectra revealed no significant perturbations at pH 3.5 from pH 6.6, suggesting remarkable stability in pOBP tertiary and secondary structures (28).

In common with pIOBP, mMUPII showed saturable binding to 1-AMA at pH 5.0, 4.0 and 3.0 (FIG. 2C). Binding affinity at both pH 5.0 and pH 4.0 was decreased about 4-fold, and 7-fold at pH 3.0, compared with pH 7.2 (Table 1). As with pIOBP, the binding capacity of mMUPII was lowered at acidic pH (less than halved at pH 3.0 compared with pH 7.2, FIG. 2C). However, MUP are monomeric, and it is unclear at this point whether the reduced binding capacity is a result of conformational/structural modifications occurring at acidic pH. Mouse MUP is thought to function as a pheromone transporter in mouse urine, which typically ranges from pH 6.18-9.02, (29). Functionality of major urinary proteins at acidic conditions has not been previously reported. Nevertheless, functional stability of mMUPII at both pH 3.0 and pH 4.0 makes this protein second promising candidate for binding/fining applications in grape juice and wine.

Example 4

Affinity of Recombinant OBP and MUP to IBMP at pH 7.2

When the present research was first initiated in 2005, rat subtype OBP-1 was targeted. Ligand binding to OBPs are now measured using fluorescent probes and their displacement by MPs, measuring an apparent $K_d$ for IBMP of 0.069 µM for rat OBP (Nespoulous et al Chem Senses 2004 29: 189-198). The *Pichia pastoris* expression system for this rat OBP subtype, OBP-1F, was provided by Dr. Pernollet. Briand et al (Eur J Biochem 2000; 267:3079-3089). After purification of this protein from the yeast growth media using single anion exchange and size exclusion chromatography on an ÄKTA Explorer FPLC System (GE Healthcare, Piscataway, N.J.), the purified protein was analyzed for binding to MPs. The present binding studies in buffer using fluorescence competitive displacement showed a high binding affinity of IBMP at pH 7.2 for rat OBP-1F with an apparent $K_d$ of 0.046 µM, comparable to the published value (Nespoulous et al Chem Senses 2004; 29:189-198). However, the protein was not able to bind to the fluorescent probe at pH 3. The purified protein used in conjunction with a protein counter fining agent (a montmorillonite clay made of aluminum silicate that is routinely employed to remove protein from wine known as bentonite) was also not able to remove MPs from wine as measured by GC/MS.

Additional target proteins with high affinity for MPs were identified: (i) porcine OBPs, apparent $K_d$=0.5-0.9 uM (Paolini et al Biochim. Biophys. Acta 1999; 1431: 179-188; Vincent et al J. Mol. Biol. 2000; 300: 127-139), (ii) mouse major urinary proteins, apparent $K_d$=0.94 uM (Ferrari et at *FEBS Lett* 1997; 401: 73-77), and (iii) human OBP, apparent $K_d$=0.9-1.1 μM (Briand et al Biochem 2002 41:7241-7252). Each of these proteins have been reported to function as monomers, with adult porcine OBP retaining its high binding affinity to IBMP at pH 3.5 (Burova et al Biochem 1999; 38: 15043-15051). Functioning at acidic pH is a desirable attribute for application of these proteins as fining agents in juice and/or wine due to the acidic matrix of pH 3-4. The full length coding sequences for mature piglet pIOBP (Genbank AF436848), mouse MUPII (Genbank AJ309921) and human OBPIIaα (Genbank AJ251021) were attained from Genbank to synthesize coding sequences for these proteins. At the 5' end of coding sequences, native signal peptide sequences were removed and replaced with the XhoI restriction site such that the protein coding region would be in frame with *S. cerevisiae* α-mating factor sequence in pPIC9 to allow for secretion of the proteins through the yeast secretory pathway in *P. pastoris*. A stop codon and an EcoRI restriction site were added at the 3' terminus. The sequences for piglet and human proteins were optimized for G+C content and preferred codon usage in *P. pastoris* (Cereghino and Cregg Microbiol Rev 2000; 24:45-66). Modified coding sequences were synthesized and cloned into the pPIC9 expression vector between the XhoI and EcoRI sites (GenScript Corp., Piscataway, N.J.). The expression cassette was subsequently cloned into the genome of *P. pastoris* by homologous recombination and protein expression was induced using 1% methanol. Following day 2 of protein expression, 130-140 mg of purified protein/L of growth media resulted for pIOBP and mMUPII proteins whereas purified hOBPIIaα was measured at 100 mg/L. Fluorescence binding assays showed all three proteins retained high affinity for the fluorescent probes at pH 7.2, comparable to published results, (Ferrari et al *FEBS Lett* 1997; 401: 73-77; Paolini et al Biochim. Biophys. Acta 1999; 1431: 179-188; Briand et al Biochem 2002 41:7241-7252) and that binding was retained at pH 3. The complete displacement of fluorescence by IBMP was shown for both pIOBP and mMUPII at pH 3.0 with apparent $K_d$ values of 1.3 and 1 μM, respectively, similar to values of 1 and 0.5 μM at pH 7.2, respectively. In addition, IPMP binds to pIOBP at both pH 7.2 and pH 3, with apparent $K_d$=4.5 and 2.1 μM respectively. The Human OBPIIaα shows binding to fluorscent probes at pH 7.2 and 3.0. All three of these proteins are candidate proteins for removal of MPs from grape juice and wine due to their binding activity at pH 3.

The interaction of OBP and MUP with odorants IBMP and IPMP was monitored by competitive fluorescent binding assays. The complete displacement of 1-AMA fluorescence by IBMP was shown for all three proteins at pH 7.2. (Table 2 and FIG. 5). Binding constants of IBMP for rOBP-1F, pIOBP and mMUPII at physiological pH, were in good agreement with data obtained from literature; Kd=0.069 uM for rOBP-1F (21,19), Kd=0.5-0.9 uM or pOBP (24, 30), and Kd=0.94 uM for mMUPII (20).

Among the three proteins, IBMP bound rOBP-1F with the highest affinity at pH 7.2 (about 10-fold more strongly to rOBP-1F than to pIOBP and 20-fold more strongly than to mMUPII), however, its application in juice is limited by lack of function/binding at pH 3.0. With the lack of binding for the rOBP-1F protein at low pH, it may be possible to develop the protein scaffold/architecture of rOBP-1F for enhanced stability at pH 3.0 through a molecular engineering approach (31).

Example 5

Affinity of pIOBP to Odorants IPMP and IBMP

Figure 6:
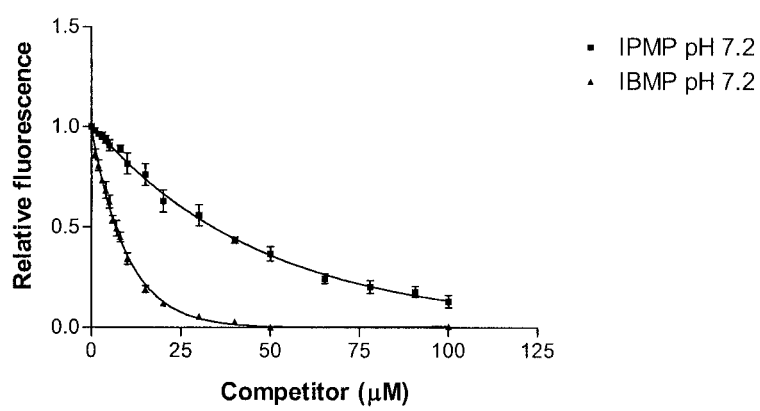
FIG. 6 shows the displacement of 1-AMA by odorants 2-isopropyl-3-methoxypyrazine (IPMP) and 2-isobutyl-3-methoxypyrazine (IBMP) from piglet OBP at pH 7.2 (A) and pH 3.0 (B). Competitive binding assays were done with 2 uM protein pre equilibrated with five fold 1-AMA concentration (10 uM). Fluorescence decay of the protein/1-AMA complex is expressed as a ratio of initial and final fluorescence against the total competitor concentration: (I−Imin)/(Io−Imin) where Io=fluorescence intensity of the protein/1-AMA complex, Imin=fluorescence intensity at saturation, and I=fluorescence intensity at a given competitor concentration.
Figure 6:
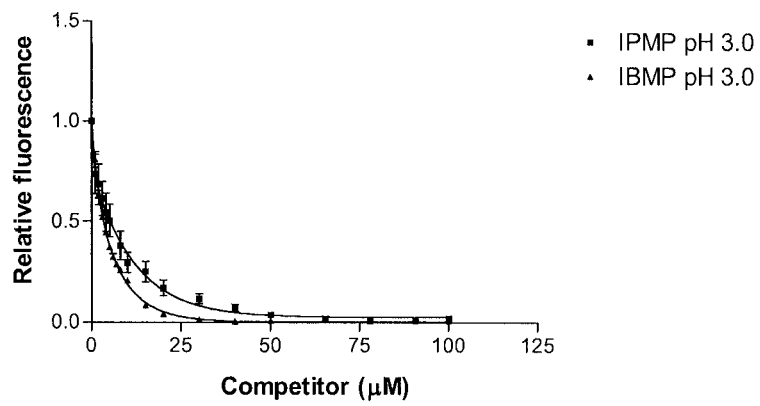

Both IPMP and IBMP displaced 1-AMA binding from pIOBP at pH 7.2 and pH 3.0 (Table 3 and FIG. 6), with slightly higher affinity observed for IBMP at both pH conditions (about 5-fold more strongly at pH 7.2 and 1.6 fold more strongly at pH 3.0 than IPMP).

In contrast to the 1-AMA pH binding profile, it was interesting to note that IPMP bound pIOBP with about 2-fold higher affinity at pH 3.0 compared with pH 7.2, which may indicate that the odorant preference for IPMP is reversed at lower pH (Table 3).

Figure 5:
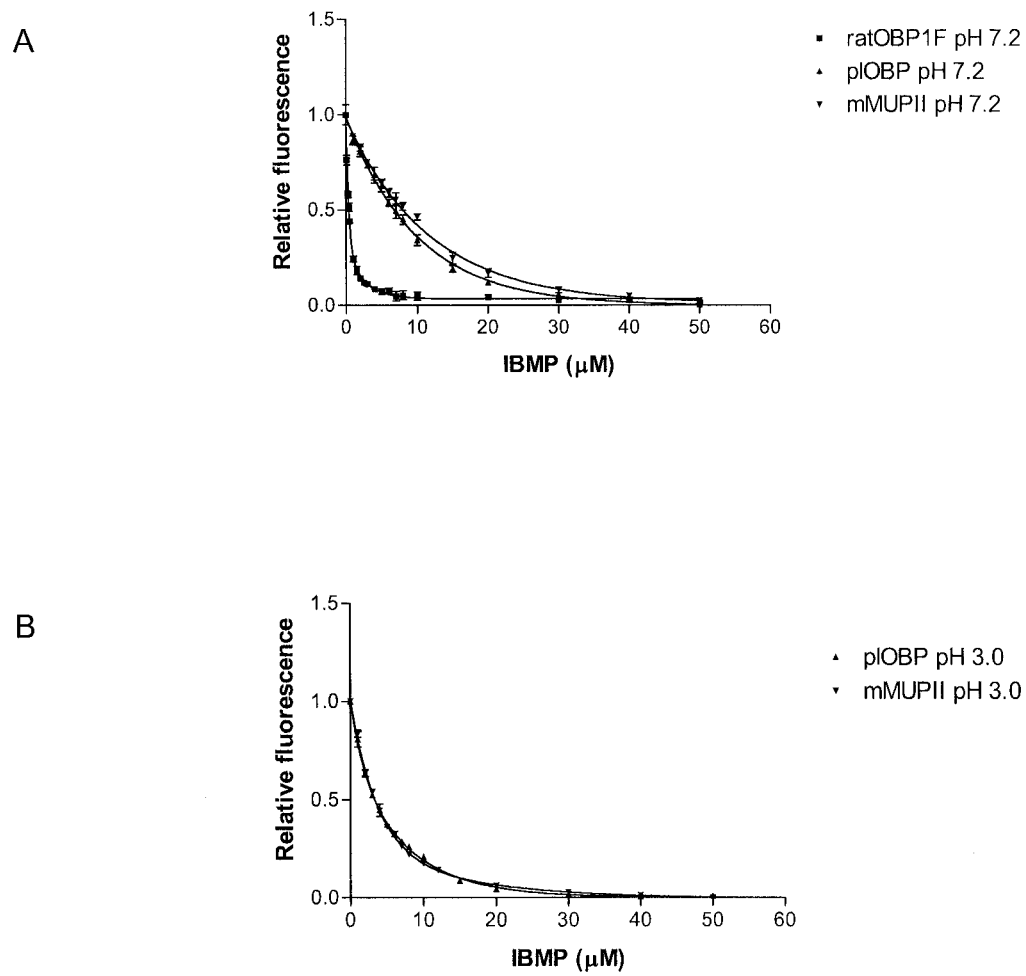
FIG. 5 shows the displacement of 1-AMA by 2-isobutyl-3-methoxypyrazine (IBMP) from rat OBP1F, piglet OBP and mouse MUPII at pH 7.2 (A) and by piglet OBP and mouse MUP II at pH 3.0 (B). Competitive binding assays were done with 2 uM protein pre equilibrated with five fold 1-AMA concentration (10 uM). Fluorescence decay of the protein/1-AMA complex is expressed as a ratio of initial and final fluorescence against the total competitor concentration: (I−Imin)/(Io−Imin) where Io=fluorescence intensity of the protein/1-AMA complex, Imin=fluorescence intensity at saturation, and I=fluorescence intensity at a given competitor concentration.

Similarly, IBMP displaced 1-AMA binding from mMUPII at pH 7.2 and pH 3.0 (Table 3 and FIG. 5).

Example 6

Bentonite Counter Fining Experiment to Remove Rat OBP-1F from Wine

OBP-1F was added to wine and protein determination was performed using the Bradford assay. Bentonite was then added to the wine with the OBP-1F at either 1 g/L, 3 g/L or 5 g/L. Protein determination was then performed after the bentonite was removed from the wine. Results are shown in Table 4.

Example 7

MP-Protein Binding Reactions (a) Filtration Method

Figure 7:
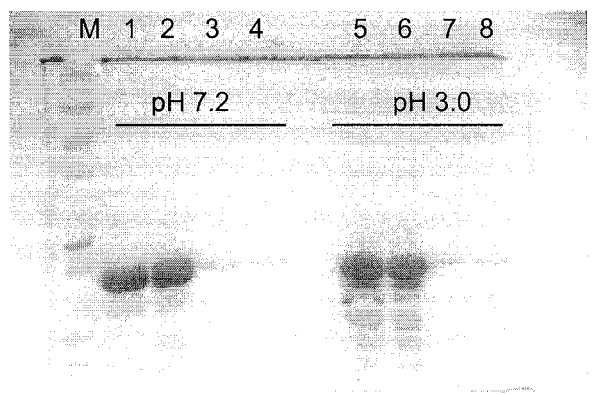
FIG. 7A. Filtration of a pIOBP binding reaction at pH 7.2 and pH 3.0 through a 10MWCO filter unit; lane M, molecular weight standard, lanes 1, 2, 5, 6 before filtration; lanes 3, 4, 7, 8 after filtration.
FIG. 7B. Filtration of mMUPII binding reaction at pH 7.2 through a 10MWCO filter unit; lane M, molecular weight standard, lanes 1-3, before filtration; lanes 4-6, after filtration FIG. 7C. Filtration of a mMUPII binding reaction at pH 3.0 through a 10MWCO filter unit; lane M, molecular weight standard, lanes 1-3, before filtration; lanes 4-6, after filtration.
Figure 7:
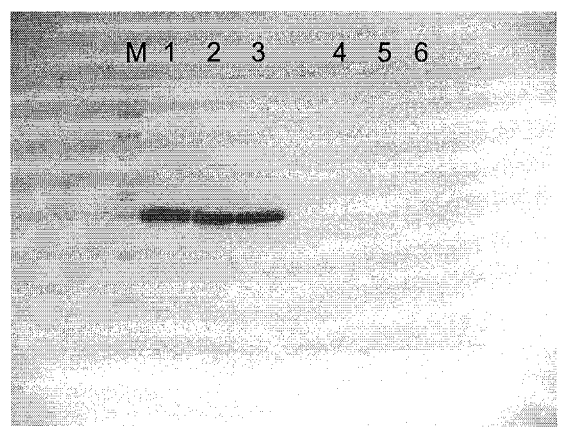
Figure 7:
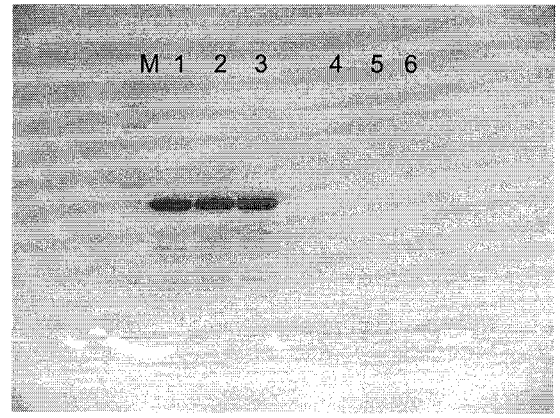

Protein removal using 10MWCO filter unit: The 10MWCO filtration unit was successful in removing the protein from the binding reaction as observed in FIGS. 7A-C for various preparations of pIOBP and mMUPII.

Figure 8:
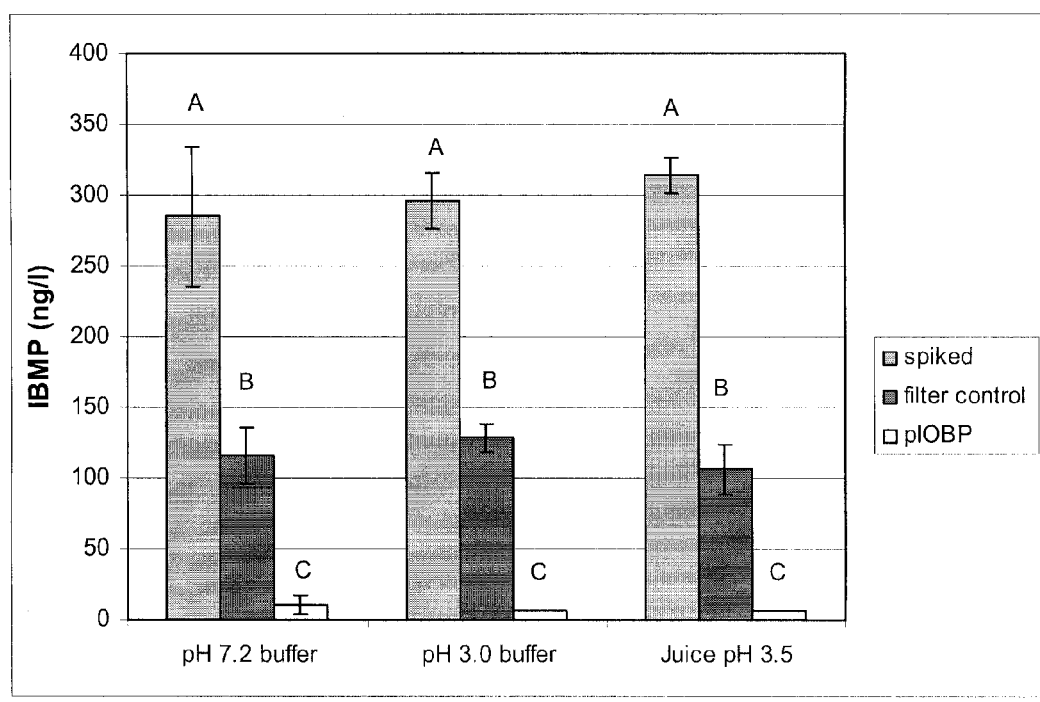
FIG. 8. Reduction of IBMP from Phosphate Citrate Buffer pH 7.2 (n=9), Phosphate Citrate Buffer pH 3.0 (n=9) and Chardonnay Juice pH 3.5 (n=6) using pIOBP protein and the 10 KDa cut off-polyethersulfone (PES) membrane filtration system. Treatments which were significantly different are represented by different letters. Data analysis was performed using ANOVA and mean separation by Fisher LSD (P<0.05).
Figure 9:
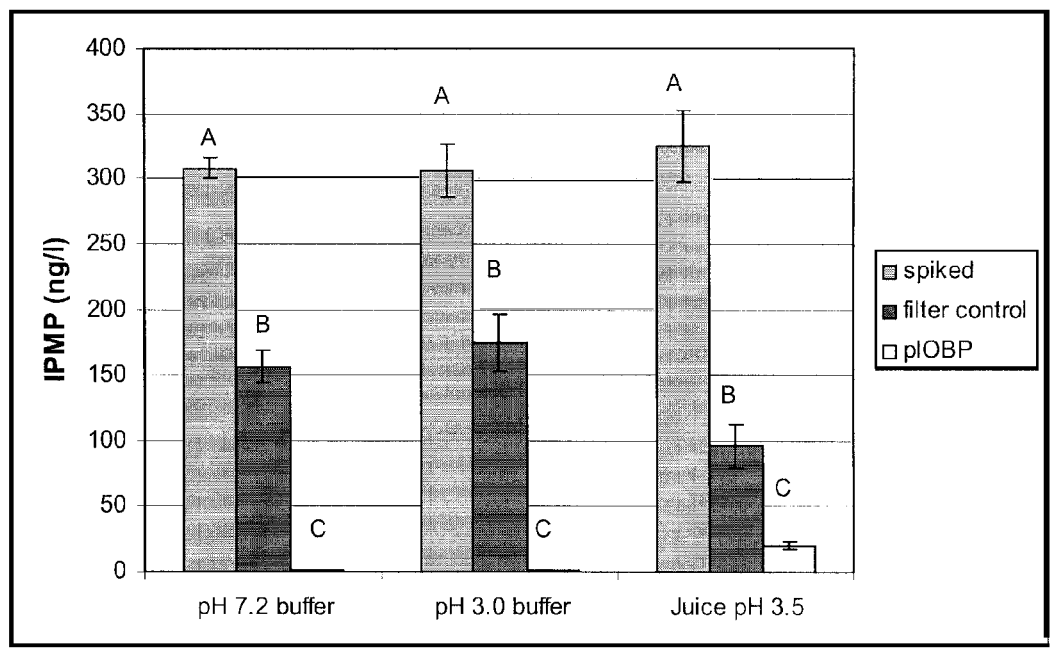
FIG. 9. Reduction of IPMP from Phosphate Citrate Buffer pH 7.2 (n=3), Phosphate Citrate Buffer pH 3.0 (n=3) and Chardonnay Juice pH 3.5 (n=3) using pIOBP protein and the 10 KDa cut-off PES membrane filtration system. Treatments which were significantly different are represented by different letters. Data analysis was performed using ANOVA and mean separation by Fisher LSD (P<0.05).
Figure 10:
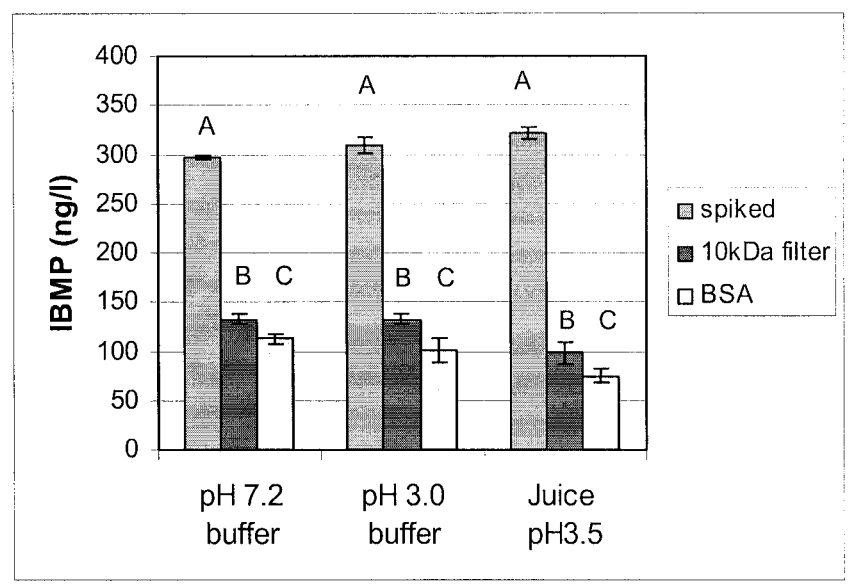
FIG. 10. Reduction of IBMP from Phosphate Citrate Buffer pH 7.2 (n=3), Phosphate Citrate Buffer pH 3.0 (n=3) and Chardonnay Juice pH 3.5 (n=3) using BSA and the 10 KDa cut-off PES membrane filtration system. Treatments which were significantly different are represented by different letters. Data analysis was performed using ANOVA and mean separation by Fisher LSD (P<0.05).

Binding Results using pIOPB and filtration removal of complex: The 10 MWCO filtration in the absence of protein removed approximately half of the methoxypyrazine in the binding reaction (FIGS. 8 and 9). Further addition of pIOBP reduced IBMP to 10 ng/L in pH 7.2 buffer and to the limit of quantification (6 ng/L) in both pH 3.0 buffer and juice (FIG. 8). The compound IPMP was reduced to the limit of quantification (2 ng/L) in pH 7.2 and pH 3.0 buffer systems and to 20 ng/L in juice following treatment with pIOBP (FIG. 9). Bovine serum albumin (BSA) was tested as a negative control to show that the removal of IBMP was specific to pIOBP and that the addition of a random protein to the binding reaction was not sufficient to remove IBMP to the limit of quantification for our system (FIG. 10).

Figure 11:
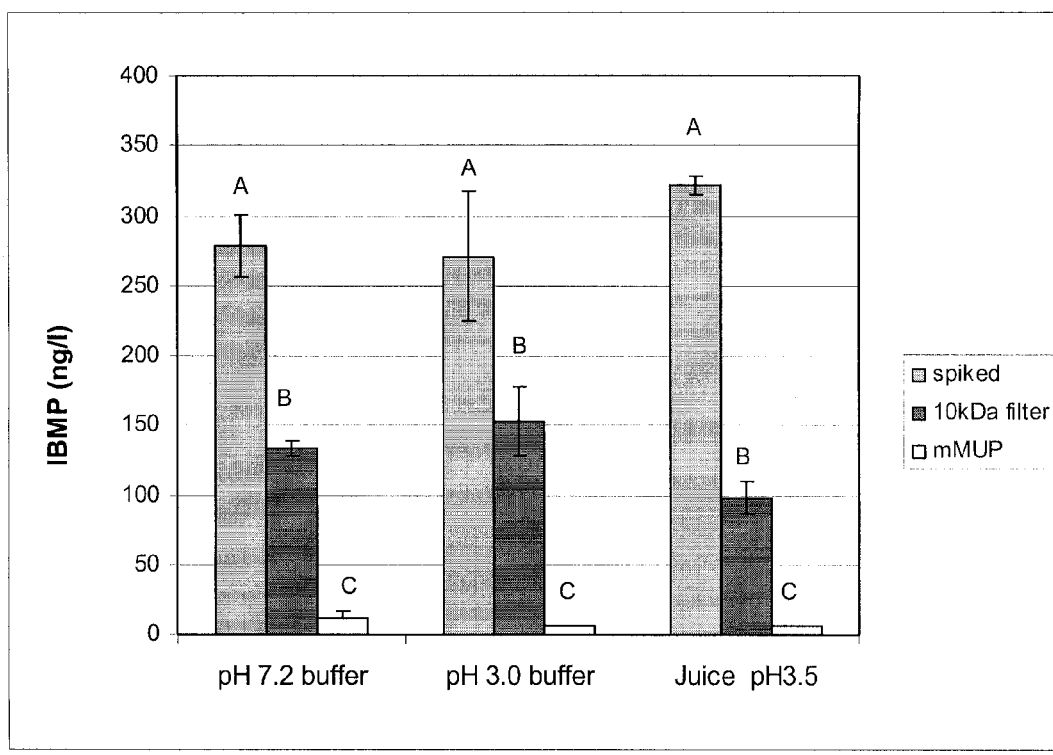
FIG. 11. Reduction of IBMP from Phosphate Citrate Buffer pH 7.2 (n=6), Phosphate Citrate Buffer pH 3.0 (n=6) and Chardonnay Juice pH 3.5 (n=3) using mMUPII protein and the 10 KDa cut-off PES membrane filtration system. Treatments which are significantly different are represented by different letters. Data analysis was performed using ANOVA and mean separation by Fisher LSD (P<0.05).
Figure 12:
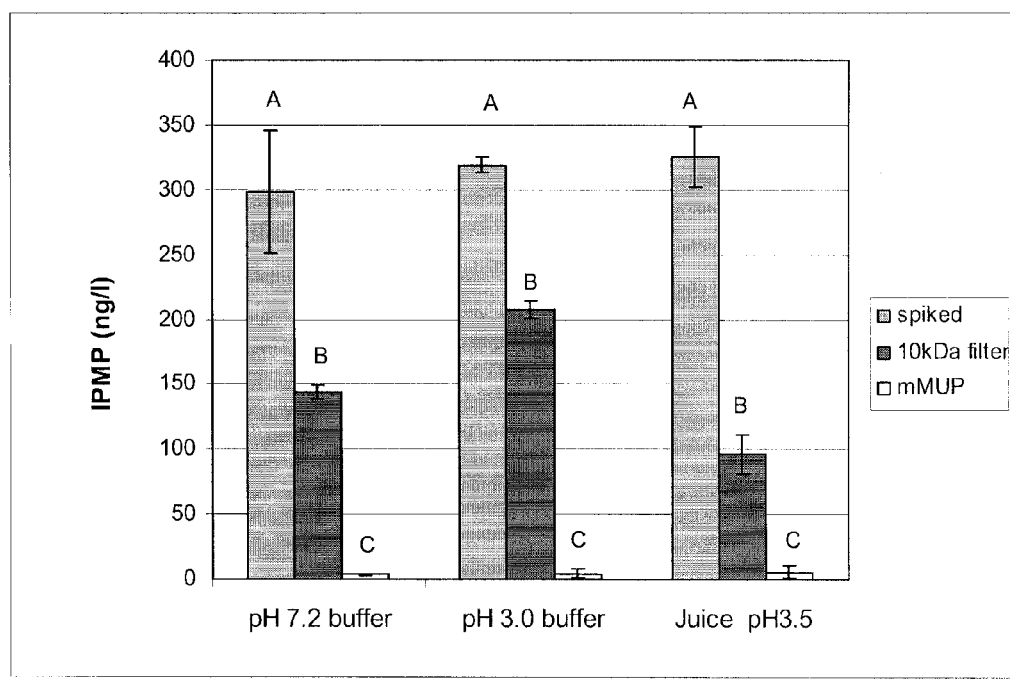
FIG. 12: Reduction of IPMP from Phosphate Citrate Buffer pH 7.2 (n=3), Phosphate Citrate Buffer pH 3.0 (n=3) and Chardonnay Juice pH 3.5 (n=3) using mMUPII protein and the 10 KDa cut-off PES membrane filtration system. Treatments which are significantly different are represented by different letters. Data analysis was performed using ANOVA and mean separation by Fisher LSD (P<0.05).

The 10 MWCO filtration in the absence of protein removed approximately half of the methoxypyrazine in the binding reaction (FIG. 11). Addition of mMUPII further reduced the IBMP concentrations to 11 ng/L in pH 7.2 buffer, and to the limit of quantification (6 ng/L) in pH 3.0 buffer and Chardonnay juice (FIG. 11). Treatment with mMUPII also reduced IPMP to near analytical limits of quantification in both buffered pH 7.2, pH 3.0, and in juice (3 ng/L, 3 ng/L and 4 ng/L respectively, FIG. 12).

(b) Bentonite Method

Figure 13:
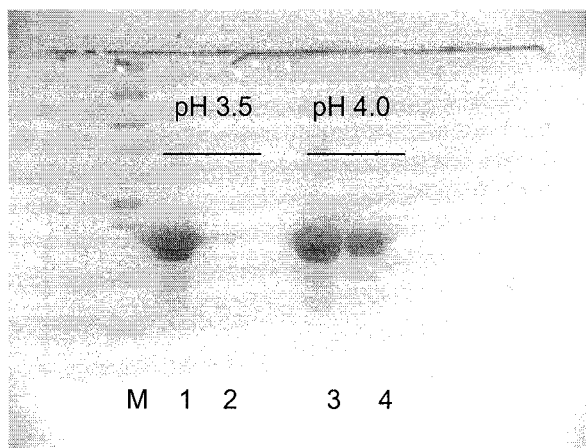
FIG. 13A. Bentonite fining (3 g/L) with 45 μM pIOBP in the binding reaction at pH 3.5 and pH 4.0; lane M, molecular weight standard, lanes 1, 3 before bentonite treatment; lanes 2 and 4, after bentonite fining.
FIG. 13B. Bentonite fining (3 g/L) of binding reaction with increasing pIOBP concentrations; lane M, molecular weight standard; lanes 1, 3, 5, 7, before bentonite treatment; lanes 2, 4, 6, 8, after bentonite fining.
FIG. 13C. Bentonite fining (3 g/L) of pIOBP binding reaction in pH 3.5; lane M, molecular weight standard; lanes 1-3, before bentonite treatment; lanes 4-6, after bentonite fining.
FIG. 13D. Bentonite fining (3 g/l) of pIOBP binding reaction in pH 4.0; lane M, molecular weight standard; lanes 1-3, before bentonite treatment; lanes 4-6, after bentonite fining.
Figure 13:
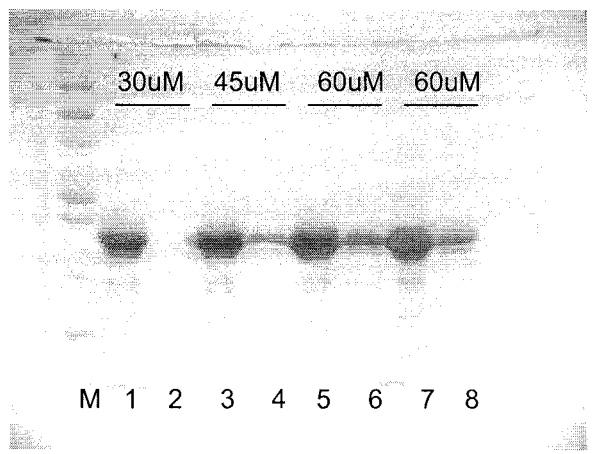
Figure 13:
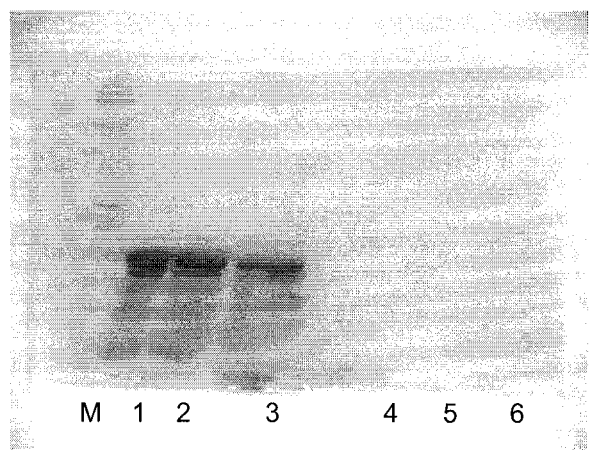
Figure 13:
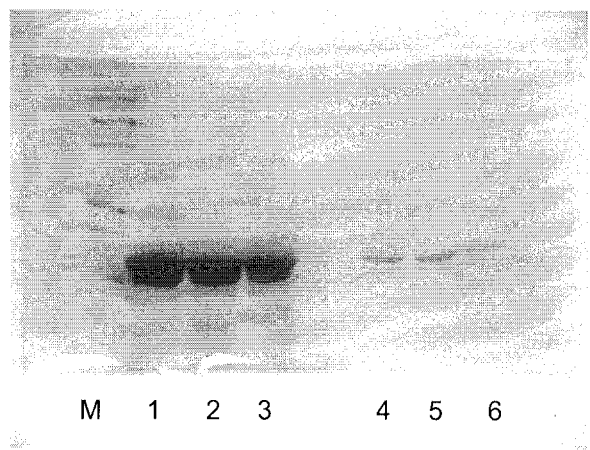

Protein removal by bentonite fining: Bentonite at 3 g/L was successful in removing 45 μM pIOBP from the binding reaction at pH 3.5, whereas it was less effective at pH 4.0 (FIG. 13A, C, D) and less effective at higher concentrations of pIOBP (FIG. 13B).

Example 8

Protein Binding Saturation Curve

Figure 14:
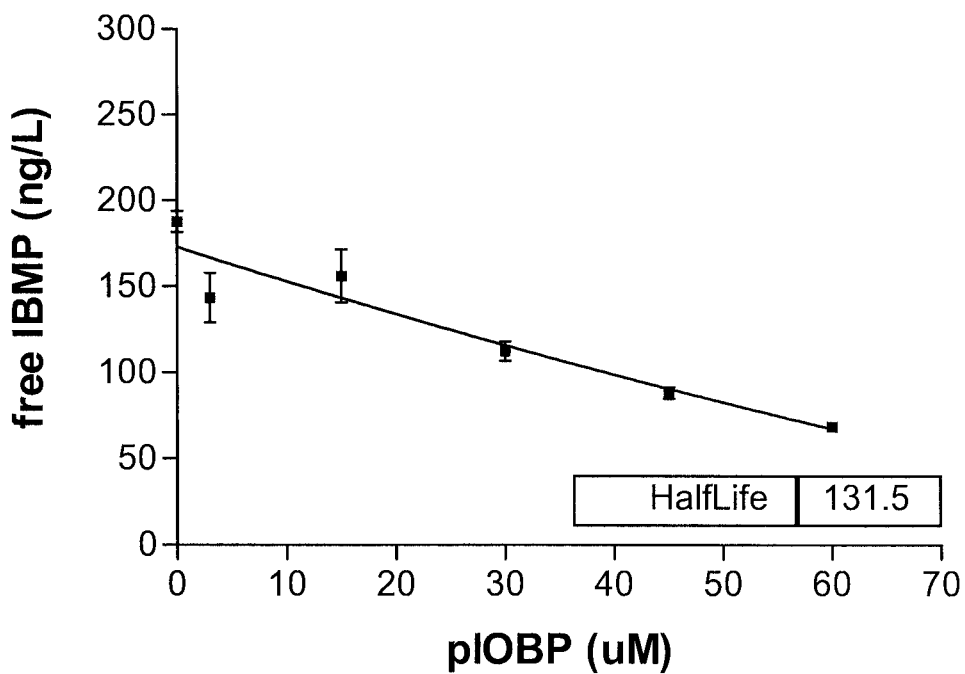
FIG. 14. Binding of IBMP, 300 ng/L with increasing pIOBP concentrations. (A) The free IBMP fraction was measured by GC/MS following separation from protein-bound complex by bentonite fining. The data was fit to a one phase exponential decay equation. (B) Although not measured, the bound IBMP fraction was determined from the difference between the starting IBMP and the free IBMP after protein addition and removal by bentonite fining. The data was fit to a one-site saturation binding curve.
Figure 14:
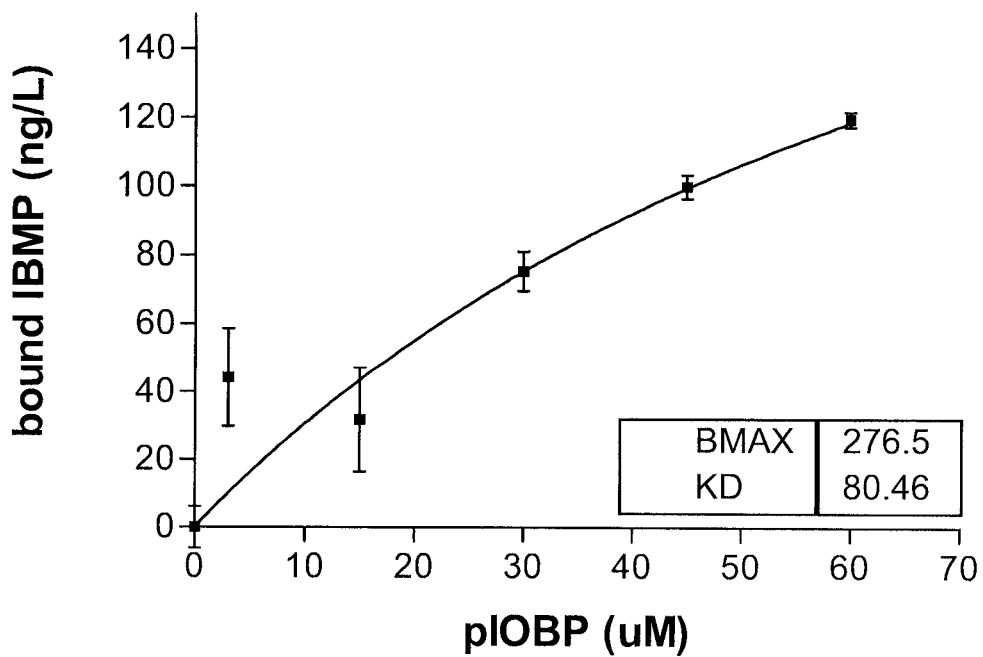

To determine protein binding saturation, a binding curve was done with 300 ng/l IBMP and increasing pIOBP concentrations of pIOBP up to 60 μM protein in reaction buffer at pH 4.0. 60 μM protein does not completely saturate binding of IBMP at 300 ng/L using this system (FIG. 14).

Example 9(a)

Binding Results Using pIOPB and Bentonite Fining to Remove Complex

Figure 15:
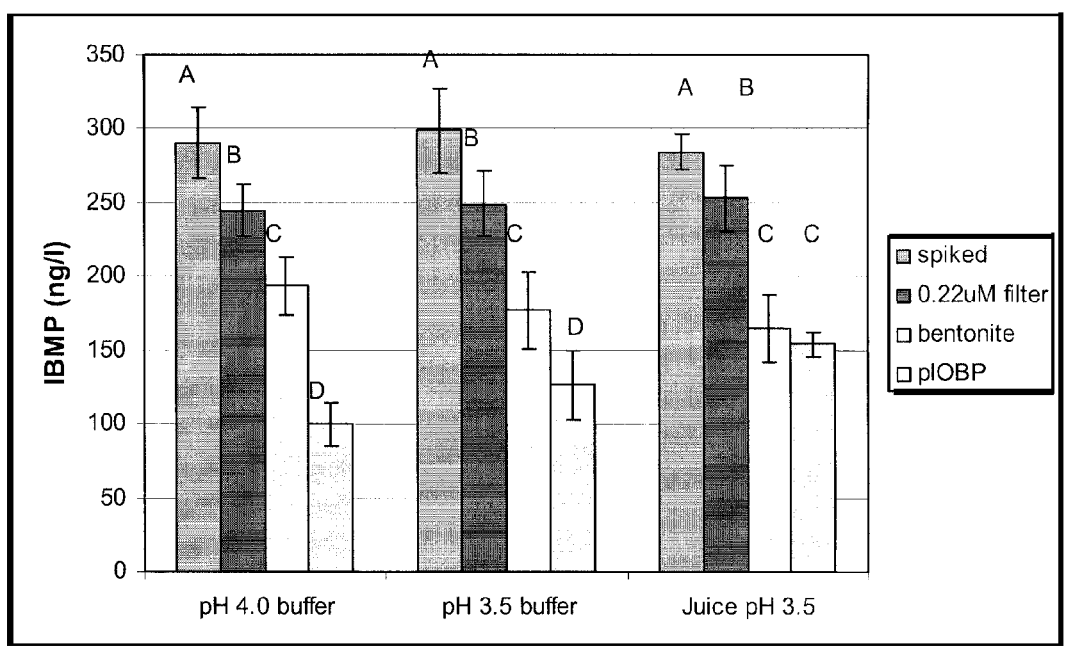
FIG. 15. Reduction of IBMP from Phosphate Citrate Buffer pH 4 (n=11), Phosphate Citrate Buffer pH 3.5 (n=12) and Chardonnay Juice pH 3.5 (n=6) using pIOBP protein and the bentonite system. Treatments which were significantly different are represented by different letters. Data analysis was performed using ANOVA and mean separation by Fisher LSD ($P<0.05$).
Figure 16:
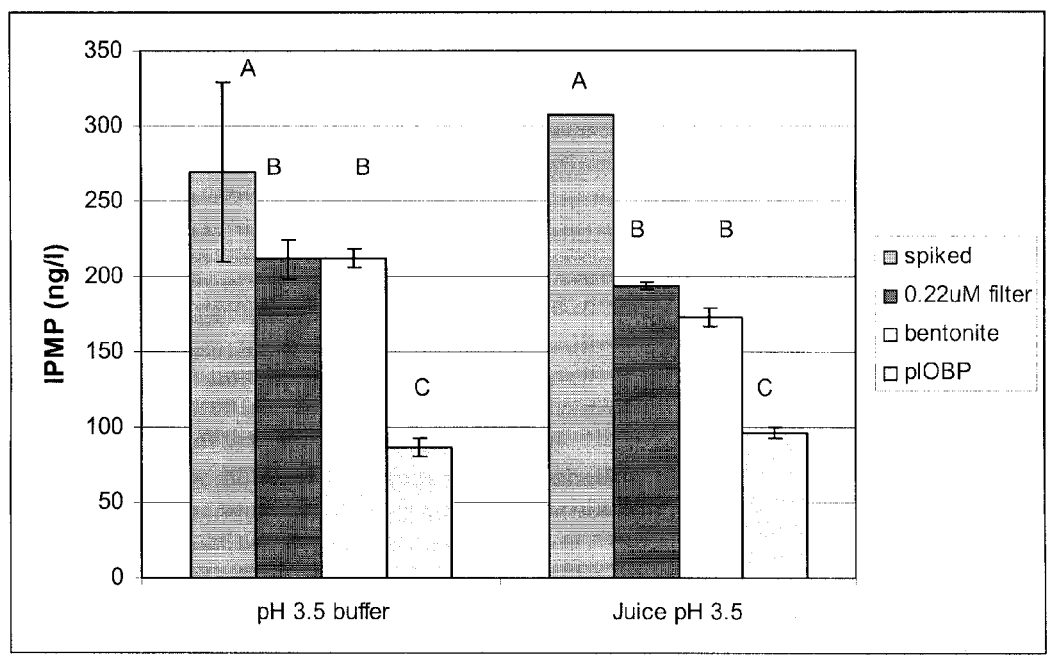
FIG. 16. Reduction of IPMP from Phosphate Citrate Buffer pH 3.5 (n=3) and Chardonnay Juice pH 3.5 (n=3) using pIOBP protein and the bentonite system. Treatments which were significantly different are represented by different letters. Data analysis was performed using ANOVA and mean separation by Fisher LSD ($P<0.05$).

In the bentonite fining method, filtration through a 0.22 μm Durapore filter was used to remove any final traces of bentonite in the reaction prior to the MP measurements. The filter itself removed approximately 15% of the IBMP from the reaction (FIG. 15). The addition of bentonite and the use of the filter without any pIOBP protein reduced the IBMP by approx. 40%. The addition of pIOBP protein reduced the starting IBMP from approximately 300 ng/L to 100 ng/L in pH 4 buffer and 125 ng/L in buffer at pH 3.5. The protein-bentonite fining method was less effective in the juice matrix, reducing the IBMP concentration to approximately 150 ng/L. Similar results are shown for IPMP reduction with pIOBP using the bentonite filtration system (FIG. 16). The starting IPMP concentration was reduced to approximately 100 ng/L in either a buffer or juice matrix as illustrated in FIG. 16.

Figure 17:
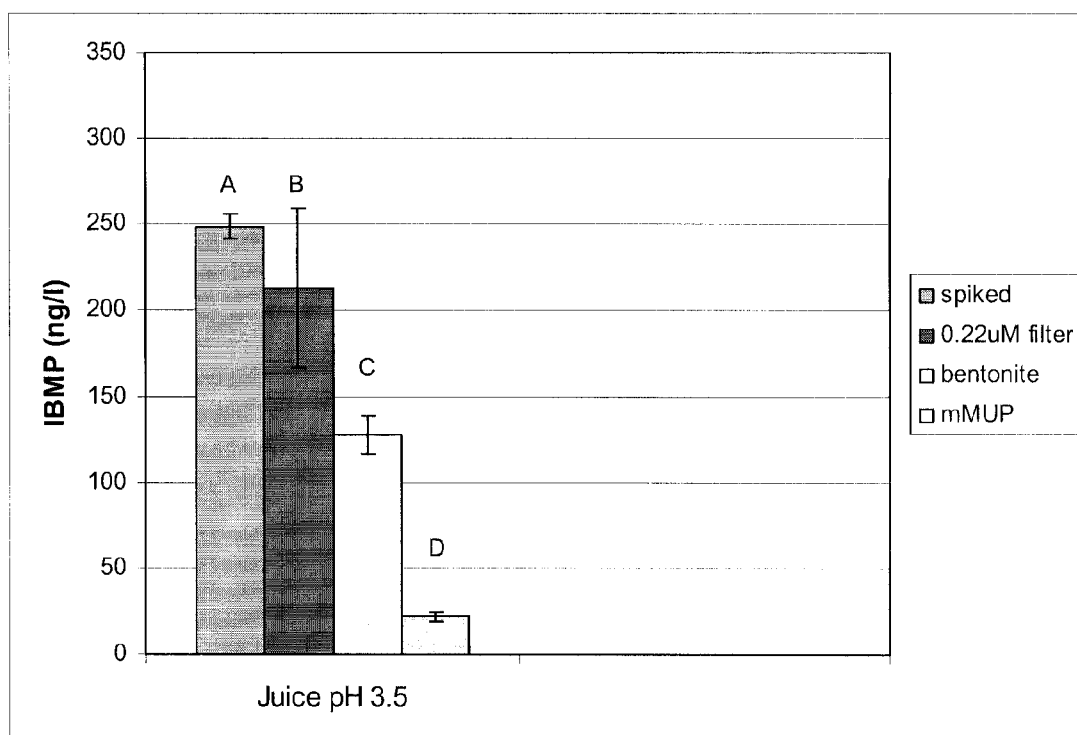
FIG. 17. Reduction of IBMP from Chardonnay Juice pH 3.5 (n=3) using mMUPII protein and the bentonite system. Treatments which were significantly different are represented by different letters. Data analysis was performed using ANOVA and mean separation by Fisher LSD ($P<0.05$).

(b) Binding Results Using mMUPII and Bentonite Fining to Remove Complex:

In the bentonite fining method, filtration through a 0.22 μm Durapore filter is used to remove any final traces of bentonite in the reaction prior to the MP measurements. The filter itself removed approximately 15% of the IBMP from the reaction (FIG. 17). The addition of bentonite and the use of the filter without any mMUPII protein reduced the IBMP by approx. 40%. The addition of mMUPII protein further reduced the IBMP in Chardonnay Juice at pH 3.5.

Example 10

Figure 18:
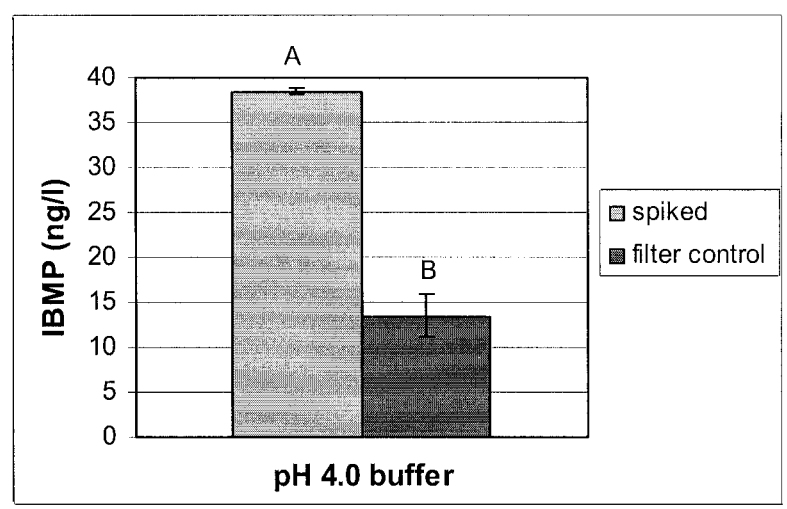
FIG. 18. Reduction of IBMP in buffer using the 10 KDa cut-off PES membrane from starting concentration of 38.5 ng/L IBMP.

IBMP (40 ng/l) in pH 4.0 buffer was filtered through 10 kDa filtration unit (PES 10 MWCO); Average, measured spiked concentration of IBMP: 38.5±0.4 ng/l. IBMP in filtrate after passage through 10 MWCO PES filter: 13.5±2.4 ng/l (65% MP reduction) (FIG. 18).

Example 11

Assessing the Feasibility of Using pIOBP, mMUPII and hOBPIIa with Bentonite as a Fining Procedure to Remove Methoxypyrazines in a Grape Juice and Wine Matrix (Prophetic Example)

These proteins, along with bentonite, are tested as a fining procedure to remove MPs from red and white grape juice. The same experimental design outlined in Example 9 is used. A sufficient volume of juice and wine is prepared and further tested by olfactory evaluation using a trained sensory panel, triangle tests and standard descriptive analysis techniques in order to determine the impact treatment has on the sensory profile of the wines (Lawless, H. T. and H. Heymann. Sensory Evaluation of Food. Principles and Practices. New York: Chapman and Hall; 1998).

Example 12

Immobilization of MP Binding Proteins on Silica for Easy Addition and Removal of Unbound and Bound Protein by Filtration (Prophetic Example)

Methoxypyrazine binding proteins that can bind MPs from MP-tainted juice or wine are coupled to an inert matrix to facilitate addition of the protein and removal of the complex in one filtration step. The immobilization of proteins on solid supports often results in increased protein stability (Bhushan et al J. Bioactive Compatible Polym. 2007 22: 174-194). Silica is an ideal choice for the solid support (Brook, M. A. Silicon in Organic, Organometallic, and Polymer Chemistry, 2000, John Wiley & Sons, Ltd.: New York) since it is approved by the Canadian Food and Drug Act (FDA) as a wine fining additive. Well-defined silica particles are synthesized using the Stöber method where particles are optimized for coverage with MP-binding proteins and large enough for efficient filtration. (Stober et al. J. Colloid Int. Sci. 1968; 26: 62-69)

Strategy 1—Immobilization using glutaraldehyde. Stöber silica is reacted with aminopropyltriethoxysilane (APTS) to generate a silica surface possessing free amines which is reacted with glutaraldehyde to produce an imine linking the glutaraldehyde to the silica surface. The MP-binding protein reacts with the remaining aldehyde of glutaraldehyde to couple the protein to the silica particle via an imine linkage (Migneault, et al Biotechniques 2004; 37: 790-796, 798-802; Can et al Biomacromolecules 2009 ASAP DOI: 10.1021/bm900011h; Walt and Agayn Tends Anal. Chem. 1994, 13: 425-430). The imine linkages are reduced to hydrolytically stable amines to improve stability under acidic conditions such as those found in juice/wine.

Strategy 2—Immobilization using allylglycidyl ether. Stöber silica is reacted with a trialkoxysilyl-functionalized glycidyl ether to yield an epoxide-modified silica surface (Bhushan et al Bioactive Compatible Polym 2007 22: 174-194; Vaidya et al Reactive Funct. Poly 2007; 67:905-915; Gelo-Pujic et al Biocat. Biotranform. 2009, 27: 45-53). The resulting epoxide residues react with free-amines of the MP-binding proteins to link protein to the solid support.

Strategy 3: Entrapping MP-binding proteins within silica structures. A number of studies have demonstrated that proteins can be entrapped within a silicon-based matrix for improved protein stability (Zelisko et al Biomacromolecules, 2008; 9: 2153-2161; Zheng et al Chem. Mater. 1998; 10: 3974-3983; Cho et al Anal. Chem. 2002; 74: 6177-6184; Zheng et al Anal. Chem. 1997; 69: 3940-3949; Frampton et al Chem. Commun. 2008; 5544-5546; Frampton et al Silicon, 2009, In Press. DOI: 10.1007/s12633-009-9004-4) that maintains protein function (Cho et al Anal. Chem. 2002; 74: 6177-6184). Proteins are entrapped within Stöber silica. Entrapping the proteins retards conformational changes that could lead to denaturation, thereby promoting the longevity and usefulness of the immobilized MP-binding proteins. For strategies 1 and 2, the immobilization process is characterized using $^{29}$Si, $^{1}$H, and $^{13}$C nuclear magnetic resonance (NMR) spectroscopy, electron microscopy, and infrared (IR) spectroscopy. For strategy 3, circular dichroism (CD) spectroscopy, fluorescence spectroscopy, and UV/visible spectroscopy are used to evaluate the structure of the protein after it is entrapped within the silica matrix. Electron microscopy and IR spectroscopy are used to study the proteins' stability with the entrapment process. The binding of the immobilized and entrapped MP-binding proteins to MPs and complex removal by filtration are compared to that found for free MP-binding proteins used in conjunction with bentonite, as previously described in Examples 6 and 7, to ensure that protein immobilization or entrapment does not adversely affect the proteins' ability to bind MP.

TABLE 1

Effect of pH on 1-AMA binding affinity for rat OBP1F, piglet OBP and mouse MUPII

| Protein | | pH | | | |
|---|---|---|---|---|---|
| | | 7.2 | 5.0 | 4.0 | 3.0 |
| rat OBP1F | Kd (uM) | 1.64 | 1.70 | ND | NB |
| piglet OBP | Kd (uM) | 1.26 | 1.45 | 2.66 | 4.30 |
| mouse MUPII | Kd (uM) | 0.49 | 1.85 | 1.97 | 3.48 |

ND; not determined
NB; no binding observed

TABLE 2

Affinity of 2-isobutyl-3-methoxypyrazine (IBMP) for rat OBP1F, piglet OBP and mouse MUPII

| | pH 7.2 | | pH 3.0 | |
|---|---|---|---|---|
| Protein | IC50 (uM) | Kd (uM) | IC50 (uM) | Kd (uM) |
| rat OBP1F | 0.25 | 0.043 | ND | ND |
| piglet OBP | 6.86 | 0.94 | 3.65 | 1.47 |
| mouse MUPII | 8.07 | 0.48 | 3.41 | 1.08 |

ND; not determined due to lack of probe binding to rat OBP 1F at pH 3.0
Kd values calculated according to Kd = [IC50]/(1 + [1 − AMA]/Kd$_{1-AMA}$), in which [AMA] = free AMA concentration, Kd AMA = dissociation constant for protein/1 − AMA complex and
[IC50] = competitor concentration causing a decay in fluorescence to half maximal intensity.

TABLE 3

Binding affinity of 2-isopropyl-3-methoxypyrazine (IPMP) and 2-isobutyl-3-methoxypyrazine (IBMP) for piglet OBP

| | pH 7.2 | | pH 3.0 | |
|---|---|---|---|---|
| Competitor | IC50 (uM) | Kd (uM) | IC50 (uM) | Kd (uM) |
| IPMP | 32.8 | 4.46 | 5.98 | 2.34 |
| IBMP | 6.86 | 0.94 | 3.65 | 1.47 |

Kd values calculated according to Kd = [IC50]/(1 + [1 − AMA]/Kd$_{1-AMA}$), in which [AMA] = free AMA concentration,
Kd AMA = dissociation constant for protein/1 − AMA complex and
[IC50] = competitor concentration causing a decay in fluorescence to half maximal intensity.

TABLE 4

| Bentonite Concentration | Protein Concentration before Bentonite addition | Protein Concentration after Bentonite addition and removal |
|---|---|---|
| 1 g/L | 10.2 ug/mL | 0 ug/mL |
| 3 g/L | 9.0 ug/mL | 0 ug/mL |
| 5 g/L | 11.4 ug/mL | 0 ug/mL |

FULL CITATIONS FOR DOCUMENTS REFERRED TO IN THE APPLICATION

1. Parr, W.; Green, J.; White, K.; Sherlock, R. The distinctive flavour of New Zealand Sauvignon Blanc: Sensory characterisation by wine professionals. *Food Qual Pref* 2007, 18, 849-861.
2. Allen, M.; Lacey, M.; Boyd, S. Determination of methoxypyrazines in red wines by stable isotope dilution gas chromatography-mass spectrometry. *J. Agric. Food Chem.* 1994, 42, 1734-1738.
3. Bogart, K. and Bisson, L. Persistence of vegetal characters in winegrapes and wine. *Practical Winery* 2006, 13-22.
4. Kotseridis, Y.; Anocibar Beloqui, A.; Bertrand, A.; Doazan, J. P. An Analytical Method for Studying the Volatile Compounds of Merlot noir Clone Wines. *Am J Enol Vitic* 1998, 49, 44-48.
5. Lacey, M.; Allen, M.; Harris, R.; Brown, W. Methoxypyrazines in Sauvignon blanc grapes and wines. *Am J Enol Vitic* 1991, 42, 103-108.
6. Chapman, D.; Throngate, J.; Matthews, M.; Guinard, J.; Ebeler, S. Yield effects on 2-methoxy-3-isobutylpyrazine concentration in Cabernet sauvignon using a solid phase microextraction gas chromatography/mass spectrometry method. *J Agric Food Chem* 2004, 52, 5431-5435.
7. Pickering, G. J., Lin, J. Y., Reynolds, A., Soleas, G., Riesen, R.; Brindle, I. The influence of *Harmonia axyridis* on wine composition and aging. *Journal of Food Science* 2005, 70 (2): S128-S135.
8. Pickering, G.; Lin, J.; Riesen, R.; Reynolds, A.; Brindle, I.; Soleas, G. Influence of *Harmonia axyridis* on the sensory properties of white and red wine. *Am. J. Enol. Vitic.* 2004, 55, 153-159.
9. Soares, A.; Borges, I.; Borges, P.; Labrie, G.; Lucas, E. *Harmonia axyridis*: what will stop the invader? In *Biological control to invasion: ladybird Harmonia axyridis as a model species*, Roy, H. and Wajnberg, E., Eds.; Springer Netherlands: 2007; pp. 127-145.
10. Pickering, G.; Karthik, A.; Inglis, D.; Sears, N.; Ker, K. Determination of Orth- and Retro-nasal Detection Thresholds for 2-Isopropyl-3-methoxypyrazine in Wine. *J Food Sci* 2007, 72, S468-S472.
11. Romero, R.; Chacon, J.; Garcia, E.; Martinez, J. Pyrazine content in four red grape varieties cultivated in a warm climate. *J Intl Sci Vigne et Vin* 2006, 40, 203-207.
12. Sala, C.; Busto, O.; Guasch, J.; Zamora, F. Influence of vine training and sunlight exposure on the 3-alkyl-2-methoxypyrazines content in must and wines from the *Vitis vinifera* variety Cabernet Sauvignon. *J Agric Food Chem* 2004, 52, 3492-3497.
13. Sala, C.; Busto, O.; Guasch, J.; Zamora, F. Contents of 3-alkyl-2-methoxypyrazines in musts and wines from a *Vitis vinifera* variety Cabernet Sauvignon: influence of irrigation and plantation density. *J Sci Food Agric* 2005, 85, 1131-1136.
14. Roujou de Boubee, D.; Cumsille, A.; Pons, M.; Dubourdieu, D. Location of 2-Methoxy-3-isobutylpyrazine in Cabernet Sauvignon grape bunches and its extractibility during vinification. *Am J Enol Vitic* 2002, 1-5.
15. Pickering, G.; Lin, J.; Reynolds, A.; Soleas, G.; Riesen, R. The evaluation of remedial treatments for wine affected by *Harmonia axyridis*. *Int J Food Sci Technol* 2006, 41, 77-86.
16. Tegoni, M., Pelosi, P., Vincent, F., Spinelli, S., Campanacci, V., Grolli, S., Ramoni, R. and Cambillau, C. Mammalian odorant binding proteins. *Biochim Biophys Acta.* 2000, 1482: 229-240.
17. Pelosi, P., Baldaccini, N. E. and Pisanelli, A. M. Identification of a specific olfactory receptor for 2-isobutyl-3-methoxypyrazine. *Biochem J* 1982, 201: 245-248
18. Pevsner, J., Rosario, R., Trifiletti, R, Strittmatter, S. M. and Snyder. S. Isolation and characterization of an olfactory receptor protein for odorant pyrazines. *Proc Natl Acad Sci USA* 1985, 82, 3050-3054.

19. Nespoulous, C., Briand, L., Delage, M. M., Tran, V. and Pernollet, J. C. Odorant binding and conformational changes of a rat odorant-binding protein. *Chem Senses* 2004, 29, 189-198.
20. Ferrari E., Lodi T., Sorbi R. T., Tirindelli R., Cavaggioni A., and Spisni A. Expression of a lipocalin in *Pichia pastoris*: secretion, purification and binding activity of a recombinant mouse major urinary protein. *FEBS Lett* 1997, 401, 73-77.
21. Briand, L., Nespoulous, C., Perez, V., Rémy, J. J., Huet, J. C. and Pernollet, J. C. Ligand-binding properties and structural characterization of a novel rat odorant-binding protein variant. *Eur J Biochem* 2000, 267, 3079-3089.
22. Campanacci, V., Krieger, J., Bette, S., Sturgis, J. N., Lartigue, A., Cambillau' C., Breer, H. and Tegoni, M. Revisiting the specificity of *Mamestra brassicae* and *Antheraea polyphemus* pheromone-binding proteins with a fluorescence binding assay. *J Biol Chem* 2001, 276, 20078-20084.
23. Guiraudie-Capraz, G., Clot-Faybesse, O., Pageat, P., Malosse, C., Cain, A. H., Ronin, C., and Nagnan-Le Meillour, P. Heterologous expression of piglet odorant-binding protein in *Pichia pastoris*: a comparative structural and functional characterization with native forms. *J Biotechnol* 2005, 117, 11-9.
24. Pernollet, J. C. and Briand. L. Structural recognition between odorants, olfactory-binding proteins and olfactory receptors, primary events in odor coding. in *Flavour Perception*, Taylor, A. and Roberts, D., Eds., Blackwell Publishing Oxford England. 2004, pp. 86-150.
25. Lackowciz, J. R. *Principles of Fluorescence Spectroscopy* Plenum Press, New York. 1983, pp. 354-363.
26. Paolini, S., Tanfani, F., Fini, C., Bertoli, E. and Pelosi, P. Porcine odorant-binding protein: structural stability and ligand affinities measured by Fourier-transform infrared spectroscopy and fluorescence spectroscopy. *Biochim Biophys Acta* 1999, 1431, 179-188.
27. Ramoni, R., Bellucci, S., Grycznyski, I., Grycznyski, Z., Grolli, S., Staiano, M., De Bellis, G., Micciulla, F., Pastore, R., Tiberia, A., Conti, V., Merli, E., Varriale, A., Rossi, M. and D'Auria, S. The protein scaffold of the lipocalin odorant-binding protein is suitable for the design of new biosensors for the detection of explosive components. *J Phys Condens Matter* 2007, 19, 395012-395018.
28. Burova, T. V., Choiset, Y., Jankowski, C. K. and Haertle, T. Conformational stability and binding properties of porcine odorant-binding protein. Biochem 1999, 38, 15043-15051.
29. Miyataka, H.; Ozaki, T. and Himeno, S., Effect of pH on $^1$H-NMR spectroscopy of mouse urine. *Biol Pharm Bull* 2007, 7, 667-670.
30. Vincent, F., Spinelli, S., Ramoni, R., Grolli, S., Pelosi, P., Cambillau, C. and Tegoni, M. Complexes of porcine odorant-binding protein with odorant molecules belonging to different chemical classes. *J Mol Biol* 2000, 300, 127-139.
31. Dantas, G., Kuhlman, B., Callender, D., Wong, M. and Baker, D. A large scale test of computational protein design: folding and stability of nine completely redesigned globular proteins. *J Mol Biol* 2003, 332, 449-460.

What is claimed is:

1. A method of reducing methoxypyrazines (MPs) in grapes or grape products comprising:
   contacting the grape or grape products with a lipocalin protein that binds to MPs at a pH of about 3 to about 4;
   forming a protein-MP complex; and
   removing the protein-MP complex from the grape or grape products.
2. The method of claim 1, wherein the lipocalin protein that binds to MPs at a pH of about 3 to about 4, is a mammalian odorant binding protein (OBP), or a mammalian pheromone binding protein (PBP).
3. The method of claim 2, wherein the lipocalin protein that binds to MPs at a pH of about 3 to about 4, is piglet OBP, MUPII, or human OBPIIa.
4. The method of claim 1, further comprising adding a fining agent that binds to proteins to the protein-MP complex.
5. The method of claim 4, wherein the fining agent is bentonite.
6. The method of claim 4, wherein the step of adding forms an insoluble fining agent-protein-MP complex and the method further comprises removing the insoluble fining agent-protein-MP complex from the grape or grape products.
7. The method of claim 6, wherein removing the insoluble fining agent-protein-MP complex from the grape or grape products is by filtration.
8. The method of claim 1, further comprising immobilizing the lipocalin protein that binds to methoxypyrazines at a pH of about 3 to about 4, to facilitate removal of the protein-MP complex from the grape or grape products.
9. The method of claim 1, wherein the step of contacting further comprises a polymer membrane and/or fining agents.
10. The method of claim 9, wherein the step of contacting further comprises:
    treating the grape or grape products with a fining agent and/or a polymer membrane,
    prior to the step of forming.
11. The method of claim 9, wherein the contacting step further comprises filtering the grape or grape products through a polymer membrane prior to the step of forming.
12. The method of claim 9, wherein the contacting step comprises treating the grape or grape products with a fining agent followed by filtering through a polymer membrane prior to the step of forming.
13. The method of claim 9, wherein the polymer membrane is a polyethersulfone (PES) membrane.
14. The method of claim 1, wherein the grape or grape products are selected from wine and grape juice.

\* \* \* \* \*